US012737285B2

(12) United States Patent
Yin

(10) Patent No.: US 12,737,285 B2
(45) Date of Patent: Sep. 15, 2026

(54) ALGORITHM TEST METHOD, ALGORITHM TEST PLATFORM, AND COMPUTER-READABLE STORAGE MEDIUM

(71) Applicant: BOE Technology Group Co., Ltd., Beijing (CN)

(72) Inventor: Xiaoyu Yin, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 191 days.

(21) Appl. No.: 18/558,171

(22) PCT Filed: Dec. 9, 2022

(86) PCT No.: PCT/CN2022/137868

§ 371 (c)(1),
(2) Date: Oct. 30, 2023

(87) PCT Pub. No.: WO2024/119471

PCT Pub. Date: Jun. 13, 2024

(65) Prior Publication Data

US 2025/0086099 A1 Mar. 13, 2025

(51) Int. Cl.
*G06F 11/3668* (2025.01)

(52) U.S. Cl.
CPC ................................ *G06F 11/3692* (2013.01)

(58) Field of Classification Search
CPC ................................................... G06F 11/3668
See application file for complete search history.

(56) References Cited

U.S. PATENT DOCUMENTS

2009/0240458 A1* 9/2009 Desineni .......... G01R 31/31835 702/120
2023/0267715 A1 8/2023 Liu et al.

FOREIGN PATENT DOCUMENTS

CN 101714166 A 5/2010
CN 106776289 A * 5/2017 ............. H04L 67/10
CN 108170589 A 6/2018
CN 111191666 A 5/2020
CN 111221719 A 6/2020
CN 107590065 B * 8/2020
CN 112150440 A * 12/2020 ........... G06V 10/751
CN 113672500 A 11/2021

(Continued)

OTHER PUBLICATIONS

Buccino et al., MEArec: A Fast and Customizable Testbench Simulator for Ground-truth Extracellular Spiking Activity, Neuroinformatics (2021) 19:185-204.

(Continued)

*Primary Examiner* — Jae U Jeon

(57) ABSTRACT

Disclosed are an algorithm test method, an algorithm test platform and a computer-readable storage medium. The test method is applied to an algorithm test platform side and includes the following acts: receiving a test task; analyzing a type and a parameter of the test task, wherein the type of the test task includes at least one of the following: an algorithm model test, an algorithm interface test and an algorithm online operation state test; according to the analyzed type and parameter, performing test preparation and issuing the test task; and receiving a test result, displaying and/or feeding back the test result.

15 Claims, 16 Drawing Sheets

(56) References Cited

FOREIGN PATENT DOCUMENTS

| | | | | |
|---|---|---|---|---|
| CN | 114780063 A | 7/2022 | | |
| CN | 114780393 A | 7/2022 | | |
| CN | 114968828 A | 8/2022 | | |
| CN | 115185797 A | 10/2022 | | |
| CN | 115344487 A | 11/2022 | | |
| CN | 115525554 A | * 12/2022 | .......... | G06F 11/3698 |
| KR | 20090049464 A | * 5/2009 | ........... | G06F 16/951 |
| WO | 2010126387 A2 | 11/2010 | | |
| WO | 2022001097 A1 | 1/2022 | | |

OTHER PUBLICATIONS

Xi et al., Performance Evaluation for Moving Target Tracking Algorithm Based on Orthogonal Test, Computer Engineering, vol. 46 No. 3 , Mar. 2020.

Li et al., Real-time performance test evaluation system for lower limb motion intention recognition algorithm, Chinese Journal of Scientific Instrument, vol. 41 No. 5, May 2020.

* cited by examiner

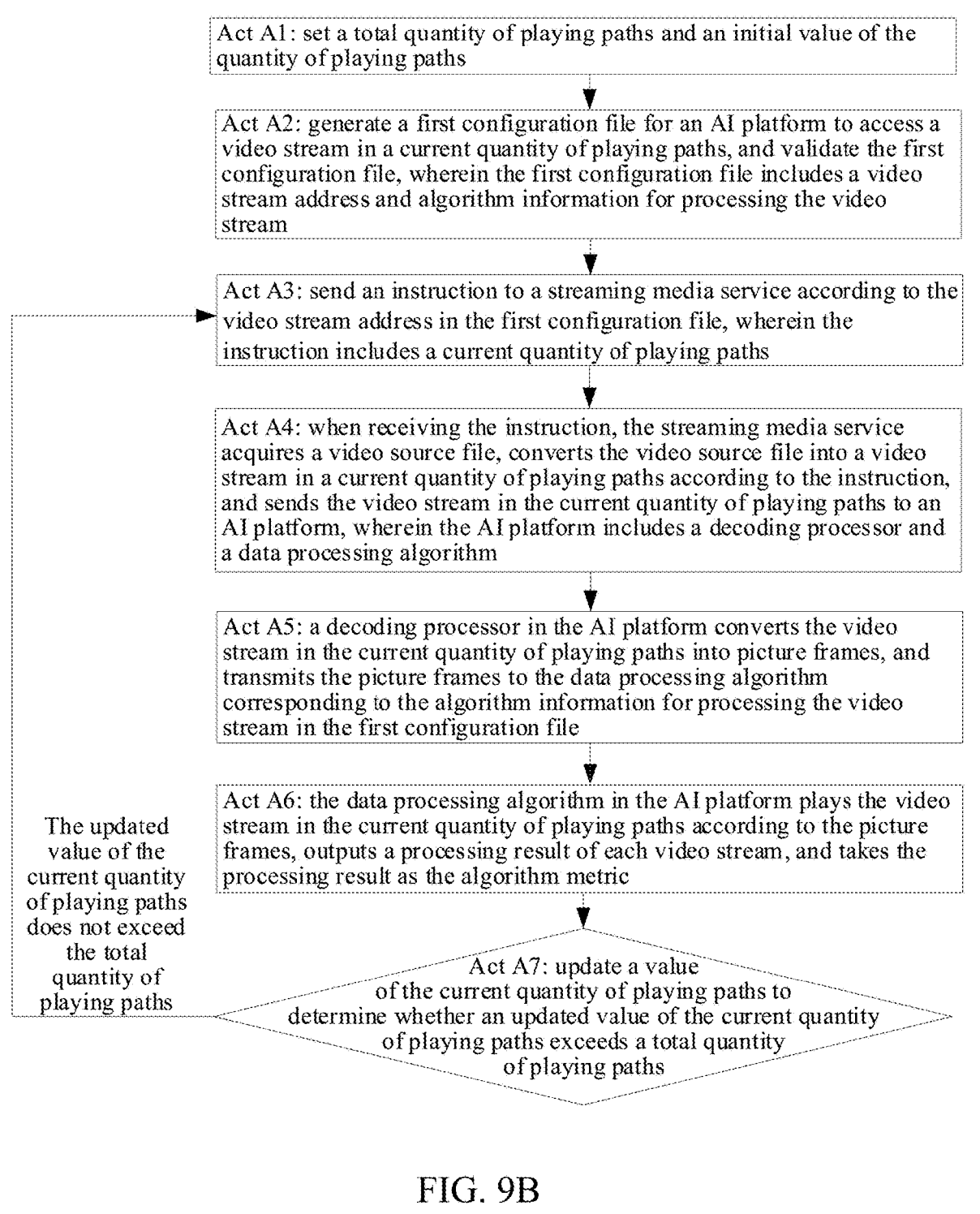

Act A1: set a total quantity of playing paths and an initial value of the quantity of playing paths Act A2: generate a first configuration file for an AI platform to access a video stream in a current quantity of playing paths, and validate the first configuration file, wherein the first configuration file includes a video stream address and algorithm information for processing the video stream Act A3: send an instruction to a streaming media service according to the video stream address in the first configuration file, wherein the instruction includes a current quantity of playing paths Act A4: when receiving the instruction, the streaming media service acquires a video source file, converts the video source file into a video stream in a current quantity of playing paths according to the instruction, and sends the video stream in the current quantity of playing paths to an AI platform, wherein the AI platform includes a decoding processor and a data processing algorithm Act A5: a decoding processor in the AI platform converts the video stream in the current quantity of playing paths into picture frames, and transmits the picture frames to the data processing algorithm corresponding to the algorithm information for processing the video stream in the first configuration file Act A6: the data processing algorithm in the AI platform plays the video stream in the current quantity of playing paths according to the picture frames, outputs a processing result of each video stream, and takes the processing result as the algorithm metric Act A7: update a value of the current quantity of playing paths to determine whether an updated value of the current quantity of playing paths exceeds a total quantity of playing paths The updated value of the current quantity of playing paths does not exceed the total quantity of playing paths

FIG. 9B

ALGORITHM TEST METHOD, ALGORITHM TEST PLATFORM, AND COMPUTER-READABLE STORAGE MEDIUM

CROSS-REFERENCE TO RELATED APPLICATION

The present application is a U.S. National Phase Entry of International Application No. PCT/CN2022/137868 having an international filing date of Dec. 9, 2022, the entire content of which is hereby incorporated by reference.

TECHNICAL FIELD

Embodiments of the present disclosure relate to, but are not limited to, a field of algorithm test technologies, in particular to an algorithm test method, an algorithm test platform and a computer-readable storage medium.

BACKGROUND

Generally, generation of algorithms needs a process of model inference, encapsulation, and deployment (i.e. launch). Current algorithm models lack automatic test access from training to launch, and cannot achieve automation of a whole process.

SUMMARY

The following is a summary of subject matter described herein in detail. The summary is not intended to limit the protection scope of claims.

An algorithm test method is provided in an embodiment of the present disclosure. The algorithm test method is applied to an algorithm test platform side and includes:

- receiving a test task;
- analyzing a type and a parameter of the test task, wherein the type of the test task includes at least one of the following: an algorithm model test, an algorithm interface test and an algorithm online operation state test;
- according to the analyzed type and parameter, performing test preparation and issuing the test task; and
- receiving a test result, displaying and/or feeding back the test result.

An algorithm test platform is also provided in an embodiment of the present disclosure, including a memory, and a processor connected to the memory for storing instructions, the processor is configured to perform acts of the algorithm test method described in any embodiment of the present disclosure based on the instructions stored in the memory.

A computer-readable storage medium is also provided in an embodiment of the present disclosure, on which a computer program is stored, when the program is executed by a processor, the algorithm test method described in any of the embodiments of the present disclosure is implemented.

Other aspects may be comprehended upon reading and understanding the drawings and detailed description.

BRIEF DESCRIPTION OF DRAWINGS

Accompanying drawings are used for providing further understanding of technical solutions of the present disclosure, constitute a part of the specification, and are used for explaining the technical solutions of the present disclosure together with the embodiments of the present disclosure, but do not constitute limitations on the technical solutions of the present disclosure. Shapes and sizes of various components in the drawings do not reflect actual scales, but are only intended to schematically illustrate contents of the present disclosure.

FIG. 9B shows a flowchart of a method for acquiring a metric of an algorithm for processing a video source file in each path provided in an exemplary embodiment of the present disclosure.

DETAILED DESCRIPTION

To make objectives, technical solutions, and advantages of the present disclosure clearer, embodiments of the present disclosure will be described in detail with reference to the accompanying drawings. It is to be noted that the embodiments in the present disclosure and features in the embodiments may be randomly combined with each other if there is no conflict.

Unless otherwise defined, technical terms or scientific terms used in the embodiments of the present disclosure should have usual meanings understood by those of ordinary skills in the art to which the present disclosure belongs. "First", "second", and similar terms used in the embodiments of the present disclosure do not represent any order, quantity, or importance, but are only used for distinguishing different components. "Include", "contain", or a similar term means that an element or article appearing before the term covers an element or article and equivalent thereof listed after the term, and other elements or articles are not excluded.

Figure 1:
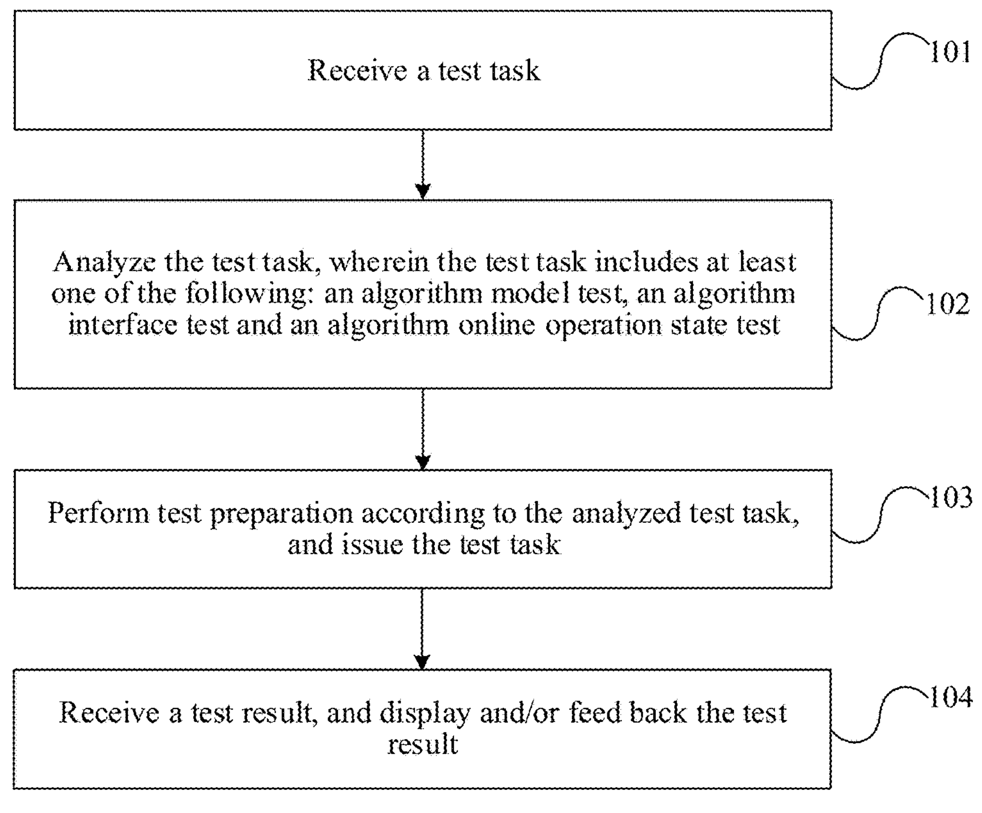
FIG. 1 is a flowchart of an algorithm test method provided in an exemplary embodiment of the present disclosure.

As shown in FIG. 1, an algorithm test method is provided in an embodiment of the present disclosure. The algorithm test method is applied to an algorithm test platform side, and includes the following acts.

In act 101, a test task is received.

In act 102, the test task is analyzed, wherein the test task includes at least one of the following: an algorithm model test, an algorithm interface test and an algorithm online operation state test.

In act 103, test preparation is performed according to the analyzed test task, and the test task is issued.

In act 104, a test result is received, displayed and/or fed back.

Optionally, the received test task includes a type of the test task, a parameter of the test task, and the like. In an embodiment of the present disclosure, a type of a test task of an algorithm test platform includes an algorithm model test, an algorithm interface test, an algorithm online operation state test and the like. The algorithm test platform analyzes the type and the parameter of the received test task, performs test preparation according to the type and parameter of the analyzed test task, and issues the test task.

Algorithm model test: the algorithm model test is performed dominantly in a stage of model inference. The algorithm model test is to verify whether a final implementation effect of an algorithm meets a product expectation which is some evaluation criteria proposed by a product or dug by a test. Content of the algorithm model test is generally algorithm accuracy and algorithm processing efficiency. For example, a face recognition product is expected to have an accuracy of 99%, so an algorithm model test of a face recognition algorithm includes verifying whether an accuracy of the face recognition algorithm can reach 99%. The algorithm model test can include a plurality of rounds of algorithm regression test, wherein the algorithm regression test refers to a test after iteration optimization of an algorithm model.

Algorithm interface test: since an algorithm may be encapsulated in a form of an interface (an API interface, an http request interface, etc.) and provided to business or users to use, it's needed to verify whether functions of the encapsulated algorithm interface meet expectations by the algorithm interface test, for example, whether transmission parameters meet algorithm requirements, whether return parameters of the algorithm and exception handling meet the requirements, etc. The algorithm interface test may include a plurality of rounds of interface regression test.

Algorithm online operation state test: after the algorithm has been launched, whether the algorithm can really operate normally needs to be tested and verified. That is, the algorithm online operation state test is a test for an operation state detection of an algorithm launched to a production environment.

The algorithm test platform in an embodiment of the present disclosure provides a whole process test scheme on a link from model inference, encapsulation to deployment (not responsible for a training process of an algorithm model), and can customize different test schemes according to different application scenarios, thus achieving the automatic test process from algorithm model training completion to launching, and improving a launch efficiency.

Optionally, the algorithm test platform in an embodiment of the present disclosure can be used as a platform independent of an algorithm development platform, an algorithm open platform and other platforms. The algorithm test platform may be integrated with an independent user interface that is used for the algorithm test platform to create a test task, present a test result, compare the test result and so on, wherein users of the algorithm test platform include algorithm testers, algorithm developers or business personnel and the like.

Optionally, the algorithm test platform in an embodiment of the present disclosure can be used as a data outlet, independently. When the test result is received, the test result is fed back to a platform, a group, personnel, etc. that need the test result.

Optionally, the algorithm test platform in an embodiment of the present disclosure may be integrated with an independent user interface through which the test result is displayed when the test result is received. In addition, the algorithm test platform in an embodiment of the present disclosure can also be used as a data outlet that feeds back the test result to the platform, group, personnel, etc. that need the test result, after receiving the test result.

In addition, optionally, the algorithm test platform in an embodiment of the present disclosure can also be disposed on a platform such as the algorithm development platform, the algorithm open platform, etc. The algorithm test platform does not have an independent user interface, and can achieve functions (e.g., creating a test task, presenting a test result, comparing a test result and so on) of the aforementioned algorithm test platform (e.g., the algorithm development platform, the algorithm open platform and the like) on the platform interfaces. After receiving the test result, the algorithm test platform feeds back the test result to the platform such as the algorithm development platform, the algorithm open platform and the like.

In some exemplary implementations, the type of the test task may further include any one or more of the following: an API service single interface function test, an API service single interface concurrency test, a stability test at a peak capacity, a metric comparison test, an algorithm resource evaluation test, etc., which are not limited in the embodiments of the present disclosure.

The API service single interface function test is used to test input and output parameters and business logic of an algorithm API service, so as to verify correct availability of an algorithm service.

The API service single interface concurrency test is used to test pressure resistance of a corresponding algorithm API service under current system resources. For example, when the API service single interface concurrency test is used to test a head detection algorithm API service, a concurrent call amount of an algorithm API is gradually increased, and an interface throughput of the algorithm service is gradually increased until an inflection point of the interface throughput appears, so as to obtain a concurrent quantity of the inflection points as a maximum pressure resistance of the algorithm API service.

The stability test at the peak capacity is used to test a stable operation duration of the algorithm service at a maximum pressure capacity. For example, the stability test at the peak capacity is used to test that an algorithm service of a face recognition algorithm operates stably for 7*24 hours without collapse and abnormal error reporting when a crowd density in any single frame is more than 15.

The metric comparison test is used to test metric performance of a same algorithm under different restrictions, or different algorithms in a same business requirement. For example, the metric comparison test is used to test an accuracy of a face recognition algorithm when quantity of photos in the face database is 100,000, 300,000 or 1 million, respectively. Or, the metric comparison test is used to test an accuracy of a crowd statistics using a head detection algorithm or a humanoid detection algorithm in a crowd statistics business.

The algorithm resource evaluation test is used to evaluate test results of a metric item of a same algorithm version in different hardware resource configurations.

A test task of an algorithm test platform in an embodiment of the present disclosure is set for algorithm products (such as a model, a model together with an algorithm having business inference) in different algorithm research and development stages and different algorithm application business requirements. When the tested algorithm is an Artificial Intelligence (AI) algorithm, its process processing, result output dimensions and the like have obvious AI service attribute characteristics. Therefore, the algorithm test platform in an embodiment of the present disclosure can be used for various types of AI algorithms.

In some exemplary implementations, receiving the test task includes any of the following:

receiving input type and parameter information of the test task in response to an operation of configuring a front page of the algorithm test platform; and receiving a test task sent by an external platform (in this case, the test task sent by the external platform includes type and parameter information of the test task).

The test task received by the algorithm test platform in an embodiment of the present disclosure may be a test task created by a user on the front page (i.e. a user interface) of the algorithm test platform, or a test task sent by an external platform. When a user creates a test task on the front page of the algorithm test platform, the type and parameter information of the test task needs to be input. When the algorithm test platform receives a test task sent by an external platform, the external platform needs to set the type and parameter information of the test task in a sent test task data packet according to a predefined format.

In some exemplary implementations, when configuring a front page of the algorithm test platform, the method further includes:

authenticating a login account, wherein the login account includes an algorithm developer account, an algorithm tester account and an algorithm business person account. The algorithm developer account is used to create and issue a test task, and to browse a test result. The algorithm developer account can be used to select a self-test data set and a test data set (the test data set here may include a model test data set, a function verification set or an operation state verification set), and a content of the self-test data set is visible to the algorithm developer account, while a content of the test data set is not visible to the algorithm developer account. The algorithm tester account is used to create and issue a test task, and to browse a test result. The algorithm tester account can be used to select a test data set and a content of the test data set is visible to the algorithm tester account. The algorithm business person account is used to browse the test result.

In an embodiment of the present disclosure, when creating a test task, the algorithm developer account can be used to select a self-test data set and a test data set. When creating the test task or browsing a test result, a content of the self-test data set is visible to the algorithm developer account, while a content of the test data set is invisible to the algorithm developer account. When creating the test task, the algorithm tester account can be used to select the test data set. When creating the test task or browsing the test result, the content of the test data set is visible to the algorithm tester account. The algorithm business person account can be used to browse the test result, but cannot be used to create the test task.

Assuming that the algorithm fails in the test after a first round of test, the algorithm developer needs to optimize the algorithm to solve a problem of the test, and then the algorithm is tested again until the problem of the test is solved, which can be referred to as a problem regression. In this process, all repeated tests except the first round of test are referred to as problem regression tests. For example, after the face recognition algorithm is tested, the algorithm test platform can compare a preset result with a result of the tested algorithm. If the accuracy does not reach 99%, then the problem is input to a defect management system (such as JIRA). After the algorithm is optimized, the algorithm is tested again. When the accuracy reaches 99% after testing, the test passes and the problem is closed in the defect management system.

Generally, test data sets cannot be exposed to algorithm developers. The test data set is used to verify quality of the algorithm model. If the test data set is exposed to the algorithm developer, and the algorithm developer uses the test data set to perform model training, then an effect of the test data set is excellent definitely when a same test data set is used to verify the algorithm model in the model inference stage, but a generalization ability of the algorithm model cannot be really reflected.

According to the algorithm test platform in an embodiment of the present disclosure, verification authority for the algorithm developers is enabled by separating the development of the self-test data set from the development of the test data set, and the algorithm developers are enabled to complete problem regression by themselves (using the algorithm developer account) in a condition that the test data set is not exposed. In addition, the algorithm developers can share platform functions such as platform data sets, system resource configuration, algorithm version management, etc., which can improve work efficiency, save labor costs and avoid waste of resources.

After a algorithm business person learns a business requirement, only a few clicks are needed to obtain latest multi-dimensional metric item information (using the algorithm business person account), without paying attention to a research and development process of the algorithm, which improves user experience greatly. For example, the algorithm test platform provides a retrieval portal through which details of all previous test records of the algorithm can be retrieved, including an algorithm version, a test data set dimension used by the algorithm, an execution duration of the algorithm test task, an execution result of the algorithm test task and the like, based on a test history of the algorithm retained by the platform. The algorithm business person only needs to input a name keyword of the algorithm to obtain the retrieved information corresponding to the algorithm test platform.

Figure 2:
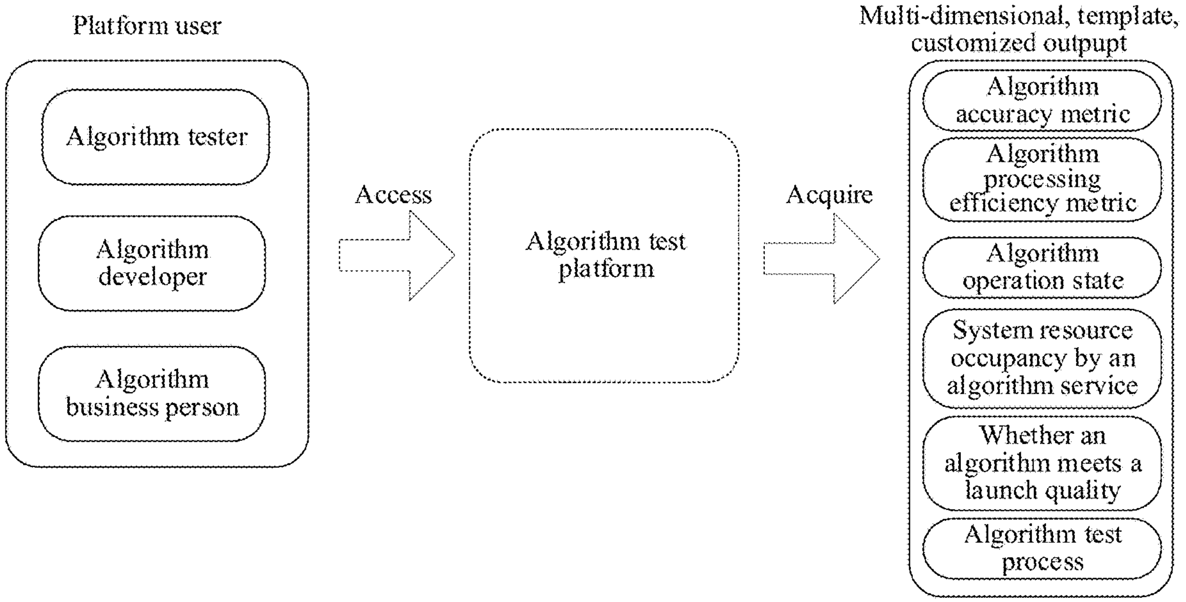
FIG. 2 is a schematic diagram of platform users and output results of an algorithm test platform provided in an exemplary embodiment of the present disclosure.

As shown in FIG. 2, an algorithm test platform in an embodiment of the present disclosure provides a unified platform for algorithm testing and metric output to algorithm developers, algorithm testers and algorithm business persons.

1) The algorithm testers are responsible for algorithm business testing. The algorithm testers use this platform to arrange test tasks and issue the test tasks for execution, an automatic regression test of the algorithm can be completed (using the test data set to automatically complete metric verification according to trigger conditions), avoiding a plurality of rounds of manual test and saving test cost.

2) The algorithm developers are algorithm model, algorithm strategy and algorithm engineering developers. Using this platform to arrange test tasks and issue them for execution, an algorithm thorough test can be performed (in an algorithm model stage, an algorithm thorough test is a self-test of the model accuracy and the processing efficiency, and the self-test data set or the test data set can be selected), so as to improve self-test quality and reduce algorithm testing cost (shorten the testing times).

3) The algorithm business persons are persons who use algorithm services, or non-professional algorithm testers or developers who are interested in algorithm metrics. Using this platform, interested metric items can be selected, current algorithm status can be viewed immediately, and historical test results can be compared in a plurality of dimensions and saved automatically.

The test process is complete and clear, and users of the platform can see the specific display of input parameters and output results of the test, which is convenient for evaluating the test process.

Figure 3:
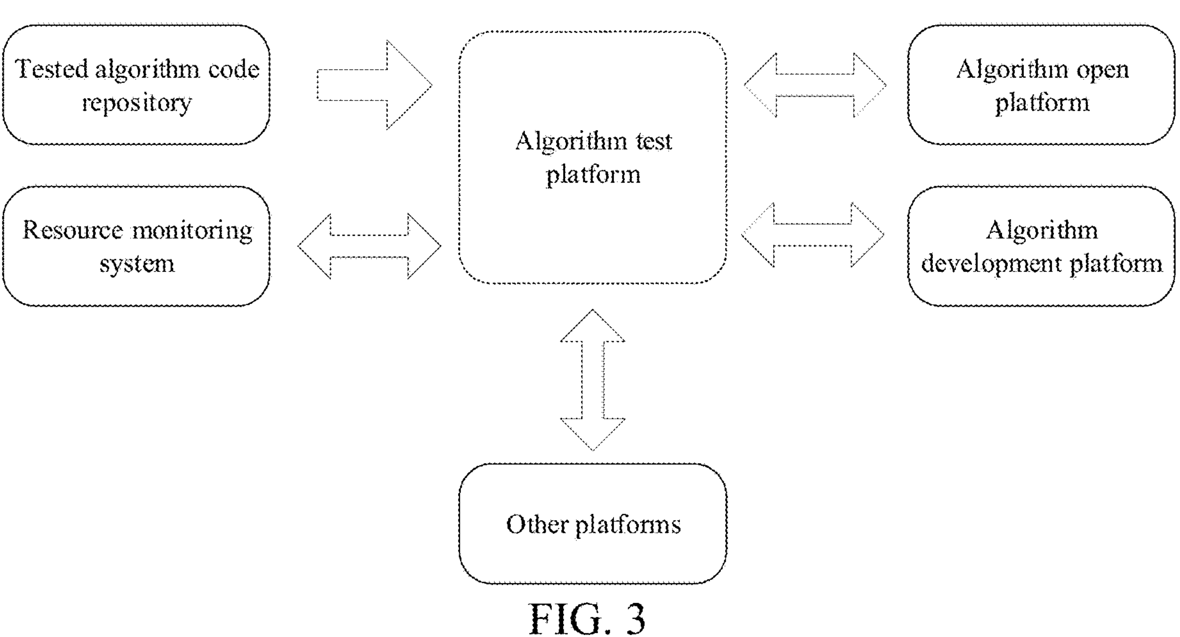
FIG. 3 is a schematic diagram of an external system that can be docked with an algorithm test platform, provided in an exemplary embodiment of the present disclosure.

As shown in FIG. 3, external systems that can be docked with the algorithm test platform include a tested algorithm code repository, a resource monitoring system, an algorithm development platform, an algorithm open platform and other platforms.

(1) The tested algorithm code repository provides codes or code addresses of the tested algorithm to the algorithm test platform as a tested object. It can also be a call address that has been deployed, as long as a deployment location can be accessed by the algorithm test platform through a way such as an HTTP request.

Any of the following scenarios can provide the codes or the code addresses of the tested algorithm to the algorithm test platform: a) a scenario that can customize the code pulling, compiling and deployment, for example, the algorithm test platform only needs to execute a command or send a request to complete the deployment; and b) the algorithm code contains model, inference and other input parameters that can be directly received from the algorithm test platform.

Other scenarios need to provide a deployment call address of the tested algorithm.

(2) The resource monitoring system is a resource monitoring system which can support an access to operation and maintenance, to perform system resource detection (detecting system resources occupied by one or more test tasks).

Optionally, hardware resources of the algorithm test platform can include test devices accessed to the algorithm test platform, such as cloud devices, server resources (with CPU and GPU), terminal devices, and edge devices, etc. After the test task is received, the type and parameters of the test task are analyzed, and the test preparation is performed, the test task is issued to these test devices, and the test devices execute the test task. After the test devices perform the test task, the algorithm test platform receives the test result from the test devices.

Optionally, software resources of the algorithm test platform can integrate software needed for requirement management, use case management and defect management, as well as some self-developed or third party tool plug-ins and the like needed in the test to ensure completeness of the test process.

The test process on the algorithm test platform is performed in a form of task. If the algorithm test platform has limited resources, the algorithm test platform can be adjusted by setting a task execution queuing plan for parallel execution or expanding the operation and maintenance dynamically.

(3) Algorithm development platform: the algorithm test platform provides the algorithm thorough test, and the algorithm test platform can support importing the self-test data set from the algorithm development platform when the algorithm test platform performs the algorithm thorough test. The algorithm test platform provides the algorithm model test, and an algorithm model of the algorithm development platform is tested through the algorithm test platform after each training is completed, so as to complete a metric item verification. The algorithm test platform provides an algorithm interface test, and supports the algorithm interface packaged by the algorithm development platform to automatically complete the algorithm interface test and then publishes the algorithm interface test on the algorithm open platform.

(4) The algorithm open platform: the algorithm open platform can support receiving the test result from the algorithm test platform to decide whether the algorithm interface can be launched. The algorithm open platform can feed back online data to the algorithm test platform to enrich the data set on the algorithm test platform and verify an online call problem.

(5) Other platforms: other platforms that have algorithm test requirements or are interested in the test result can complete docking of the algorithm test platform by negotiating private access protocols.

In an embodiment of the present disclosure, by docking the algorithm test platform with platforms such as the algorithm development platform and the algorithm open platform, the algorithm test platform can be directly used for testing while the algorithm development platform, the algorithm open platform and other platforms do not need to create their own test platforms or test environments.

Figure 4:
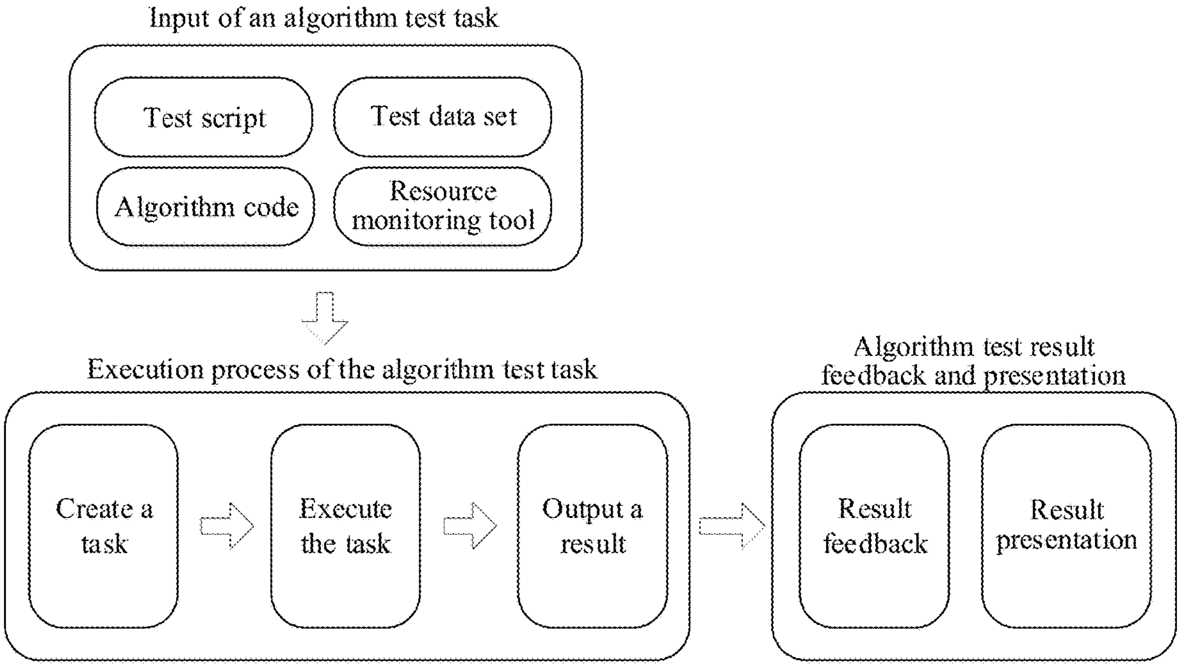
FIG. 4 is a schematic diagram of a data flow direction of an algorithm test platform provided in an exemplary embodiment of the present disclosure.

As shown in FIG. 4, data of the algorithm test platform flows from an input of the algorithm test task, goes to a execution process of the algorithm test task, and then the algorithm test result is fed back and presented.

(1) The input of the algorithm test task includes algorithm codes (a tested object), a test data set (including a model test data set, a function verification set or an operation state verification set for testing the algorithm functions), a resource monitoring tool (a tool interface or a system for monitoring the system resource usage), a test script (a code script for assisting testing), etc.

Optionally, the resource monitoring tool can be the resource monitoring system shown in FIG. 3 or a resource monitoring plug-in. When the resource monitoring system is used, an agent tool needed by the resource monitoring system can be installed on the test device, and status information can be automatically monitored by the agent tools and the resource monitoring system.

In an embodiment of the present disclosure, the tested algorithm codes oriented to the algorithm test platform can be not only AI algorithm codes, but also other arbitrary type of algorithm codes. A data set on the algorithm test platform which is used for algorithm evaluation includes not only the test data set, but the also self-test data set and fed-back online data, wherein the fed-back online data are usually actual user data (which can be desensitized data) generated after application of the algorithm, and the self-test data set is usually a data set used by the algorithm developers to test by themselves the algorithm to be tested that is developed by themselves. Therefore, the content of the self-test data set is visible to the algorithm developer account. Optionally, the content of the self-test data set is visible or invisible to the algorithm tester account.

Objects (such as GPU utilization rate, CPU utilization rate, memory utilization rate, etc.) monitored by the resource monitoring tool in an embodiment of the present disclosure have AI characteristics, and the resource selection and resource monitoring of the test task can be fed back to each other, and a real-time result of the resource monitoring can be used as a forward pre-judgment reference item for the resource selection of the test task.

In addition, an execution result of the tested algorithm in an embodiment of the present disclosure also has the AI characteristics. For example, the execution result can not only be used to judge an iteration effect of the model, but also be used as a basis for instantly selecting an application of the algorithm model according to a specific resource configuration. That is, the resource selection during an actual application of the tested algorithm is not randomly matched, it can be configured with reference to the resource monitoring result and the algorithm execution result in the test result.

In an embodiment of the present disclosure, a test script can be generated according to the type and the parameters of the test task during the test preparation. Or, after a test script of a first round of test task has been generated, the algorithm test platform can store the test script corresponding to the test task for a next regression test. The algorithm codes can be located in the tested code repository shown in FIG. 3, or the algorithm codes can be the call address that has been deployed.

(2) The execution process of the algorithm test includes creating a task, executing a task and outputting a test result.

(3) Feedback and presentation of the algorithm test results includes result feedback (result notification) and result presentation (comparative display and effect presentation).

As shown in FIG. 4, solid boxes under the input of the algorithm test task, the execution process of the algorithm test task and the feedback and presentation of the algorithm test result represent the contents that need to be included for achieving a corresponding test purpose. For example, when a test task is input, input information of the test task includes algorithm codes, test data sets, resource monitoring tools, and test scripts, etc. (optionally, the test scripts can also be generated by the algorithm test platform according to the input parameters). When executing a test task, the execution process of the test task includes creating a task, executing the task and outputting a result. The feedback and presentation of the test result include the feedback of the test result and the presentation of the test result.

Figure 5:
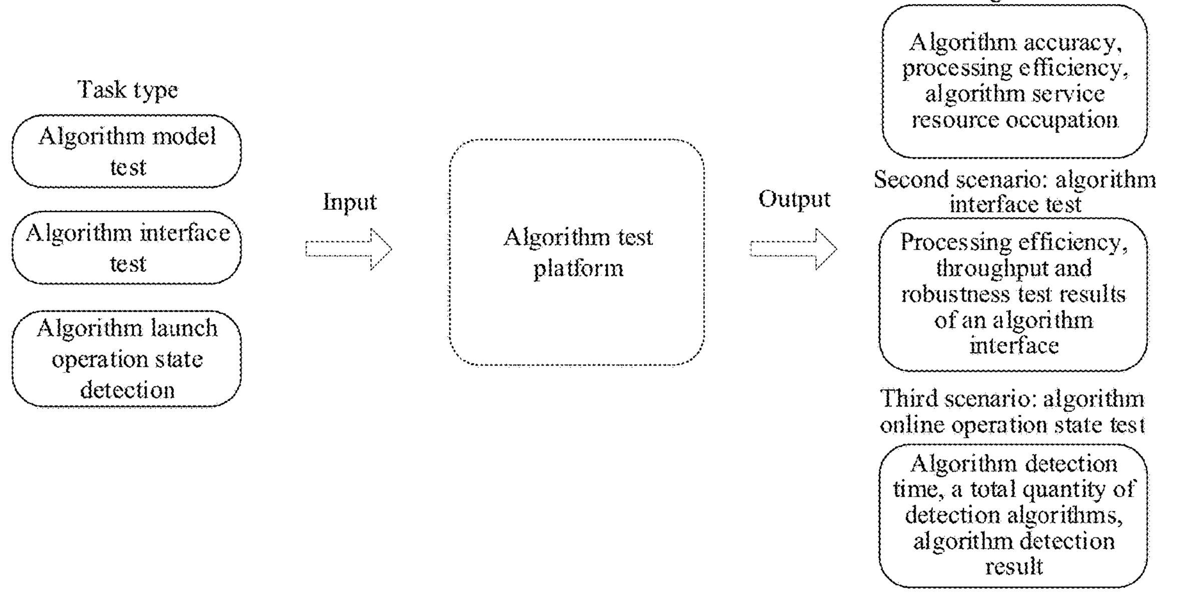
FIG. 5 is a schematic diagram of a process of algorithm testing from issuing a task to outputting a result, provided in an exemplary embodiment of the present disclosure.

As shown in FIG. 5, on the algorithm test platform, the user issues the test task after completing the test task arrangement, and obtains the task execution results.

1) The platform input relates to different task types including an algorithm model test, an algorithm interface test, an algorithm online operation state detection, etc.

2) The platform output relates to test results of metric item parameters in different test scenarios. For example, for an algorithm model test, test results of metric item parameters can include algorithm accuracy, processing efficiency, and algorithm service resource occupation and so on. For an algorithm interface test, test results of metric item parameters can include processing efficiency, throughput and robustness test results of the algorithm interface. For the online operation state test of the algorithm, the test results of metric item parameters can include an algorithm detection time, a total amount of detection algorithms, an algorithm detection result and so on.

In an embodiment of the present disclosure, a user inputs different types and parameters of the test task to an algorithm test platform, and the algorithm test platform creates and executes test tasks corresponding to scenarios according to different types and parameters of the tasks, and outputs corresponding test results according to various scenarios.

In an embodiment of the present disclosure, dimensions of the test result output by the algorithm test platform include an algorithm metrics, a system resource occupancy, a system resource configuration and so on, wherein the algorithm metrics have specific AI business significance. For example, output dimensions of a face recognition algorithm include a GPU configuration, a quantity of input video streams, a quantity of face databases, a recognition accuracy, a missing recognition rate, a false recognition rate, etc. Different test tasks can be customized or use an algorithm metric dimension built in the system.

In an embodiment of the present disclosure, the test data set of the tested algorithm can be pictures, videos, audio, files or label data, etc. Algorithm processing depends on a processing performance of a CPU, a GPU, a memory and other modules. Therefore, in the algorithm interface test, an interface processing efficiency (a processing duration of each flow), a throughput (such as in fps) and a robustness test result (a robustness of long-term capacity data input) of the tested algorithm are related to the processing performance of the test data set of the tested algorithm and the modules such as a CPU, a GPU and a memory.

In some exemplary implementations, a parameter of the test task includes at least one of the following: a model test data set, a functional verification set, or an operation state verification set.

Configuring the front page of the algorithm test platform includes:

selecting a model test data set, a function verification set or an operation state verification set according to the test data set provided by the algorithm test platform, wherein the data set provided by the algorithm test platform is classified according to different application scenarios, and a secondary classification is performed on the data set in each application scenario according to at least one of the following dimensions: metric item information, camera information, picture scenario information and environment information.

The algorithm test platform in an embodiment of the present disclosure supports multi-dimensional and multi-scenario comparison of algorithm metrics by combining and supporting different business scenarios in a form of small sample granularity through fine classification of test data sets and comparison of algorithm metrics according to more fine classification dimensions. In addition, test efficiency of testers can be greatly improved by the secondary classification of the test data sets.

In some exemplary implementations, the algorithm test method further includes:

providing an input interface for online data feedback, and adding the fed-back online data to the test data set.

In an embodiment of the present disclosure, the online data may include user application data on the algorithm open platform and online feedback data of product applications of other systems through desensitization and other processes. Current technologies lack a unified entrance for feeding back the online data to the testing process. The online data follows different projects and different business applications, and cannot be effectively collected and fed back to the test process. In an embodiment of the present disclosure, a unified entrance for feeding back the online data to the test process is provided, which is convenient for feeding back the online data to the test process.

The algorithm test platform in an embodiment of the present disclosure can provide a one-key import function. That is, the online data can be added into the test data set through the one-key import function. For example, when the user clicks a one-key import button, the algorithm test platform displays an input box for the user to input an address of the online data to be imported. When the user inputs the address of the online data to be imported (for example, the address can be IP+port+path+database format), the algorithm test platform can display a list of data tables and a list of fields which can be imported. The user can select part or all of the data tables, or part or all of the fields under a certain data table to be imported. After the user selects the data tables and fields to be imported, the algorithm test platform can provide a data set list for the user to select the data set to which the online data is to be imported. After the user selects one or more data sets from the data set list, the algorithm test platform can import the online data into the data set selected by the user.

In some exemplary implementations, the parameters of the test task include a type attribute parameter, a task execution frequency, a result output rule, and a message notification rule.

In some exemplary implementations, when the test task is an algorithm model test, the type attribute parameters include algorithm model related parameters, model test data set related parameters, system resource demand parameters, and concerned metric item parameters.

In some exemplary implementations, when the test task is an algorithm interface test, the type attribute parameters include algorithm interface related parameters, function verification set related parameters, system resource demand parameters, and concerned metric item tests.

In some exemplary implementations, when the test task is an algorithm online operation state test, the type attribute parameters includes algorithm interface related parameters and operation state verification set related parameters.

Figure 6:
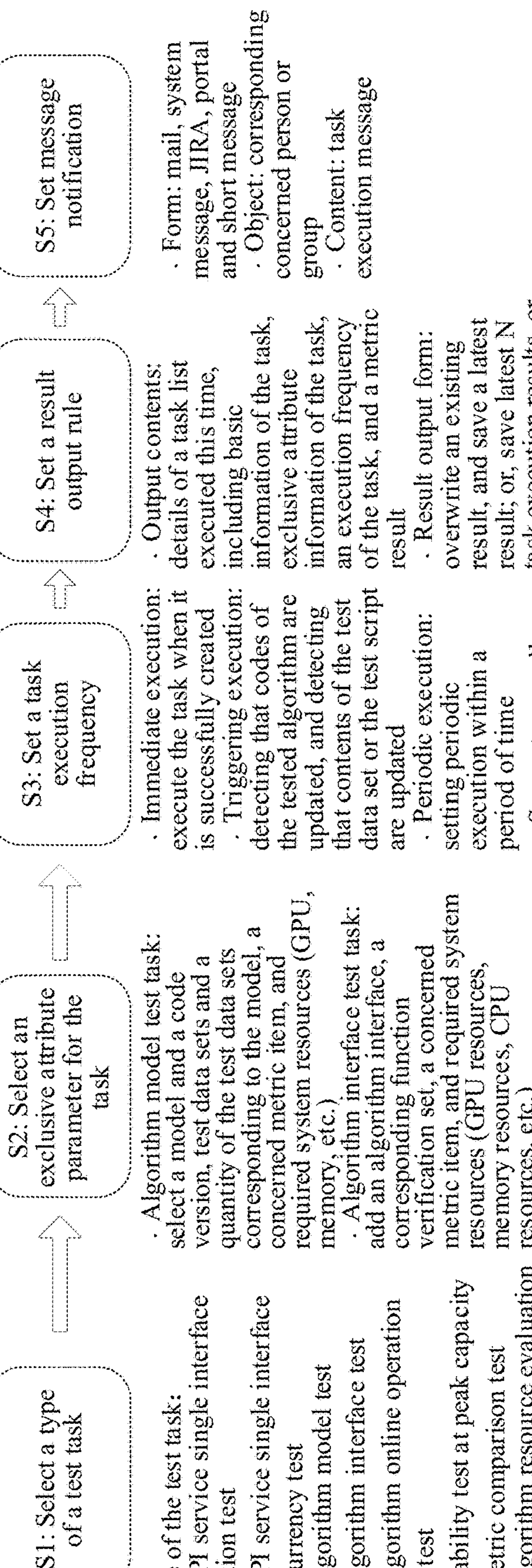
FIG. 6 is a flowchart of creating a test task provided in an exemplary embodiment of the present disclosure.

In some exemplary implementations, as shown in FIG. 6, creating the test task through the front page of the algorithmic test platform, includes acts S1 to S5.

In the act S1, a type of the test task is selected.

The type of the test task includes any one or more of the following: an API service single interface function test, an API service single interface concurrency test, an algorithm model test (for an algorithm model test, a concept of regression means a plurality of rounds of test after iteration optimization), an algorithm interface test (for testing an algorithm encapsulated in an interface form), an algorithm online operation state test (for testing an operation state of an algorithm launch to a production environment), a stability test at peak capacity, a metric comparison test, and an algorithm resource evaluation test.

In the act S2, exclusive attribute parameters are selected for the task.

For example, exclusive attribute parameters of the algorithm model test task include a model and code version, model test data sets and a quantity of the model test data sets corresponding to the model, concerned metric items, required system resources (GPU, memory, etc.). Exclusive attribute parameters of the algorithm interface test task include an algorithm interface, a corresponding function verification set, concerned metric items, required system resources (GPU resources, memory resources, CPU resources, etc.). Exclusive attribute parameters of the online operation state detection task include an algorithm interface to be detected, a corresponding operation state verification set and a response assertion.

In the act S3, the task execution frequency is set.

For example, the task execution frequency includes:

(1) immediate execution: the task is executed when it is successfully created;

(2) triggering execution: it is detected that codes of the tested algorithm are updated, and it is detected that contents of the test data set or the test script are updated; and (3) periodic execution: periodic execution within a period of time is set.

Users can manually start and stop execution of the test task.

The algorithm is an iteration optimization process. For a specific algorithm, after a round of testing, if the test fails, the algorithm can re-execute the test task to verify the algorithm again after optimization, which is referred to as an automatic regression test. If the execution of the test task is triggered by detecting that the codes of the tested algorithm are updated, the test result can be generated as soon as the test is performed and the codes are submitted without an intermediate process. That is, the algorithm test platform has an automatic regression test function of the algorithm metrics, which improves the test efficiency.

In the act S4, a result output rule is set.

Output contents are selected. The output contents may include details of the task list executed this time, including basic information of the task, exclusive attribute information of the task, an execution frequency of the task, metric test results, etc.

Result output forms are selected. Existing results are overwritten and a latest result is saved. Or, latest N task execution results are saved, or all the results are saved.

In the act S5, a message notification is set.

A message notification form is chosen, such as a mail, a system message, a JIRA (a project management software), a portal and a short message.

An object of the message notification is selected, such as a corresponding concerned person or group.

message notification contents are selected, such as a task execution message.

Optionally, after the algorithm test platform in an embodiment of the present disclosure receives the test result, the test result can be fed back to the concerned persons or groups needing the test result. For example, the test result can be fed back to the concerned persons or groups of one or more of the algorithm development platform, the algorithm open platform or other platforms, so that an authority to observe, explain or adjust the test result is not limited to the algorithm test platform itself, that is, users of other platforms can observe, explain or adjust the test result.

Test Task Example 1: Algorithm Model Test Task Arrangement 1. an algorithm model test task (task name, task creator, remark information) is created.

2. an algorithm model, model test data sets corresponding to the algorithm model and the quantity thereof, concerned metric items and required system resources (GPU, memory, etc.) are added to the task.

Each model corresponds to a kind of model test data set, and dimensions of the model test data set are determined according to an applicable scenario of the model. For example, a model test data set of an OCR recognition model can include a handwritten recognition model test data set, a printed recognition model test data set and so on. The model test data set of the OCR recognition model can also be classified into a printed ID card identification model test data set and a business license identification model test data set.

A storage format of the data set is planned during a first test and stored in a fixed directory. For example, XX data set is in XX model directory.

The metric items of each model are planned according to an existing mapping relationship. For example, algorithm metrics of the OCR recognition model can include: a recognition accuracy, a system resource, an average utilization rate of GPU resources.

3. a task execution frequency is set and a manual execution is supported.

The task execution frequency includes an immediate execution (the execution starts as soon as the task is successfully created), a triggering execution (detecting that model codes are updated, and detecting that the test data set or the test script contents are updated), a periodic execution (setting to execute periodically within a period of time), etc.

4. a result output rule is set. The result mainly includes details of the task list executed this time (including basic task information, model information, verification set information, a task execution frequency and a metric result).

The result output rule includes overwriting existing results and saving a latest result. Or, the latest N task execution results are saved.

5. a message notification form and a group to be notified are set. When the test task is completed, a corresponding concerned person is notified by a mail, a system message, JIRA or other forms.

Test Task Example 2: Algorithm Interface Test Task Arrangement 1. an algorithm interface test task (a task name, a task creator, remark information) is created, and a test type (an interface function test or an interface performance test) is selected.

2. an algorithm interface, a corresponding function verification set, concerned metric items and required system resources (GPU resources, memory resources, CPU resources, etc.) are added to the task.

Interface function test metric items: the metric items of each interface are specified according to an existing mapping relationship.

Functional test verification set: customized templates (including an interface name, an interface URL, input parameters, assertions, etc.).

Performance test verification set: customized templates (including an interface name, an interface URL, input parameters, assertions, runtime, concurrency, etc.).

3. a task execution frequency is set and a manual execution is supported.

The task execution frequency includes an immediate execution (the execution starts as soon as the task is successfully created), a triggering execution (detecting that model codes are updated, and detecting that the selected verification set contents are updated), a periodic execution (setting to execute periodically within a period of time), etc.

4. a result output rule is set. The result mainly includes details of the task list executed this time (including basic task information, algorithm interface information, verification set information, a task execution frequency and a metric result).

The result output rule includes overwriting existing results and saving a latest result. Or, the latest N task execution results are saved.

Test task example 3: algorithm online operation state test task arrangement 1. an algorithm online operation state task (task name, task creator, remark information) is created.

2. an algorithm interface to be detected, a corresponding operation state verification set and a response assertion are added to the task.

A URL address of the algorithm interface, an owner of the algorithm interface (associated JIRA user), the operation state verification set, and the response assertion are needed to be associated when an algorithm interface is added.

3. a task execution frequency is set and a manual execution is supported.

The task execution frequency includes an immediate execution (the execution starts as soon as the task is successfully created), a triggering execution (detecting that the selected model codes are updated), a periodic execution (setting to execute periodically within a period of time), etc.

4. a result output rule is set. The result mainly includes details of the task list executed this time (including basic task information, algorithm API information, verification set information, a task execution frequency and an execution result).

The result output rule includes overwriting existing results and saving a latest result. Or, the latest N task execution results are saved.

The execution results include a detection time, a total quantity of detection algorithms, a quantity of successes, a quantity of failures, an average detection duration, detection algorithm items (whether the algorithm items pass, a detection duration).

After receiving the type and parameter information of the input test task, the algorithm test platform analyzes the type and parameters of the test task, creates the test task, adds the task to a test task queue, and executes test tasks in the test task queue in sequence.

The test execution process includes: starting the test script corresponding to the type of the task, completing the compiling, deploying and starting of algorithm codes according to input parameters (including a model name, a model version, a model data set name, concerned metric items, a system resource configuration (X GPU, X CPU, etc.)) when creating the test task, or calling the algorithm interface address, waiting for the complement of the test execution, calculating the concerned metric items according to the input parameters, and outputting the metric items to the result file at a corresponding position as needed.

In some exemplary implementations, the test result includes a test result of the concerned metric item, a test process record, and a verification log of the tested algorithm. The test result of the concerned metric item and the test process record can be generated by the algorithm test platform according to the received test result, and the verification log of the tested algorithm are generated by the test device and sent to the algorithm test platform.

For example, a test metric output format can be: XX task, XX model, XX time, XX data set, XX data volume test result.

The test process record may include: task details (adding of a secondary task type, task-specific parameters, task execution frequency, task result output rules, all parameters of message notification), task execution start and end time, actual resource occupation for task execution, etc.

The verification log of the tested algorithm includes a process log of the tested algorithm from startup to completion of processing the verification set.

In some exemplary implementations, a test result is fed back according to a pre-set message notification format, a person or group to be notified, and a format template for message notification contents. When the test task is completed, corresponding concerned people or groups are notified by a mail, a system message, JIRA, a portal, a short message and the like.

In some exemplary implementations, when the test result is displayed, the test result may be presented according to the concerned metric item, or according to the test task, the test time, the resource occupancy and the like may be selected for result viewing.

For example, when comparing metric items, XX metrics of a same algorithm interface in different tasks can be selected for comparison. Or, XX algorithm interfaces and XX metrics in the last N tasks are selected to compare the results. For another example, when comparing the results, the detection results and average detection duration of each online operation state of different test tasks can be selected for comparison. Or, previous execution results of the algorithm, which the XX person in charge is responsible for, are selected to view.

In some exemplary implementations, when the test results are displayed, the results may be displayed or stored in the form of a chart, table, or page. For example, charts can be used to display XX metrics of a same model in different tasks, or XX models and XX metrics in the last N tasks are selected for result comparison. For example, the OCR recognition algorithm can have the test tasks of identifying ID cards, identifying business licenses, identifying posters, etc. An OCR recognition model is used in different test tasks. By displaying a recognition accuracy metric of a same model in different tasks graphically, recognition accuracies of the OCR recognition model in different test tasks can be compared.

The algorithm test platform in an embodiment of the present disclosure displays the test results through visual means (charts, tables or pages, etc.), and can template the output of algorithm metric items. For example, the face recognition algorithm sequentially completes the test with test data sets with a distance of 5 m to 20 m from the camera, and can give the distribution of accuracy between 5 m and 20 m. If it is a version iteration for multiple regression tests, comparing with the performance improvement of the history version algorithm, it can provide visual, scenario-based and multi-dimensional comparison effects. For another example, according to the test task dimension, data set dimension, hardware environment (such as several GPUs, how many CPUs), etc., the metric responses of the algorithm in different scenarios are subdivided, and these are displayed to users in the form of charts, graphs, pages, etc., providing reference for the business decision-making of algorithm users.

In some exemplary implementations, viewing task execution results and metric item comparison results can be supported when the test result is displayed.

In some exemplary implementations, downloading in a PDF format or an Excel format is supported when the result is viewed. Previewing in HTML format is supported. Sharing to others in PDF format or link form is supported.

Figure 7:
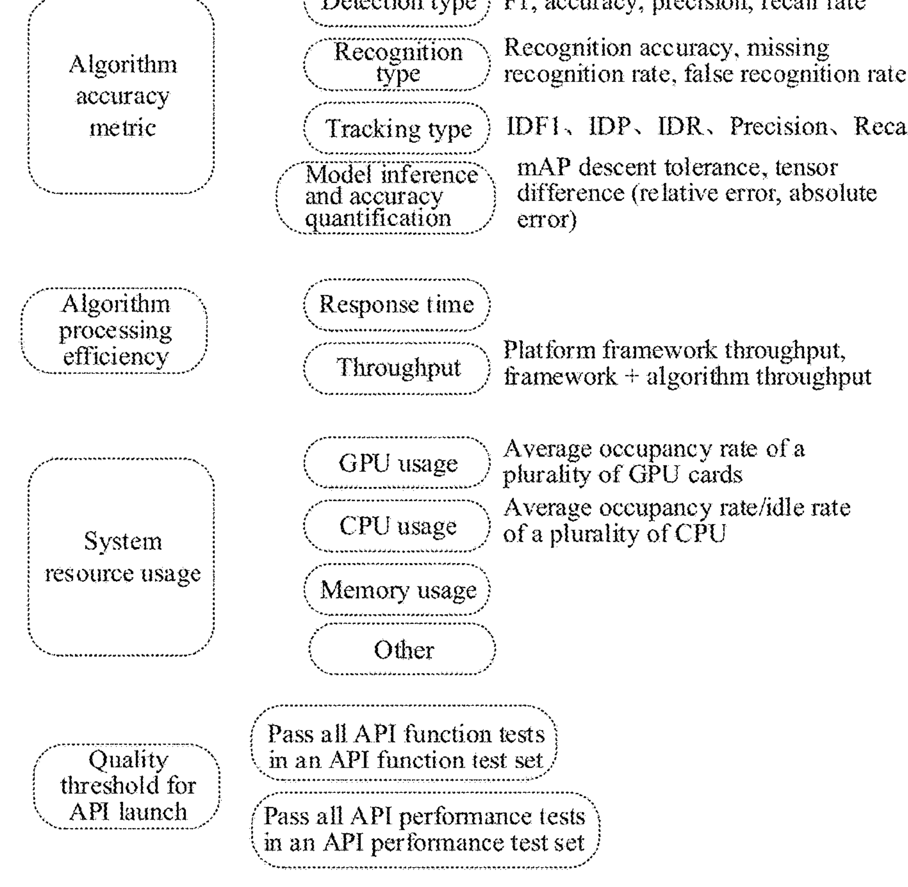
FIG. 7 is a schematic diagram of an algorithm metric classification method provided in an exemplary embodiment of the present disclosure.

In some exemplary implementations, as shown in FIG. 7, the metrics item parameters include algorithm accuracy metrics, algorithm processing efficiency, and system resource usage, wherein:

secondary classification is performed on the algorithm accuracy metrics according to different application scenarios;

the algorithm processing efficiency includes a response time and a throughput; and the system resource usage includes a GPU usage, a CPU usage, a memory usage, etc.

In some exemplary implementations, as shown in FIG. 7, the metric item parameters may further include quality thresholds for API launch, where the quality thresholds for API launching include all API function tests in an API function test set are passed and all API performance tests in an API performance test set are passed.

It's understandable that, when API function tests in the API function test set and/or API performance tests in the API performance test set are partially passed, the test result can be fed back to the algorithm developer, and the algorithm developer retests the algorithm by using the algorithm test platform in an embodiment of the present disclosure after the algorithm is modified until all API function tests in the API function test set are passed and all API performance tests in the API performance test set are passed. In addition, when the launched algorithm is iteratively updated, the iteratively updated algorithm can also be tested by the algorithm test platform in an embodiment of the present disclosure, and the iteratively updated algorithm is launched to the algorithm open platform until all the test metric item parameters pass the test.

In some exemplary implementations, as shown in FIG. 7, the algorithm accuracy metric can be divided into a detection type accuracy metric, a recognition type accuracy metric, a tracking type accuracy metric and a model inference and accuracy quantification metric, wherein the detection type accuracy metric includes F1, accuracy, precision, recall rate and the like, the recognition type accuracy metric includes a recognition accuracy, a missing recognition rate, a false recognition rate and the like, the tracking type accuracy metric includes IDF1, IDP, IDR, Precision, Recall and the like, and the model inference and accuracy quantification metric includes mAP descent tolerance, tensor difference (including a relative error, an absolute error) and the like.

When the test task is created by the algorithm test platform, the concerned metric item is selected according to the metric item recommended by the algorithm test platform.

In some exemplary implementations, the metric item parameters may be classified according to the type, the deployment mode, and the application scenario of the test task.

As shown in Table 1, according to the types of the test tasks, the metric item parameters and the test options are classified as follows:

TABLE 1

| Test task | Test option | Metric item | System resource | Note |
|---|---|---|---|---|
| Algorithm interface test | Function test | 1. No fail test stake | CPU, Memory, GPU utilization rate | |
| | Performance test | 1. Single interface response time is not less than XXms 2. When N users request concurrently, TPS is not lower than XX, and response times of 90% users are not higher than XX | CPU, Memory, GPU utilization rate | |
| Algorithm model test | Function test | Accuracy metric, specified as different accuracy metrics used by different models | CPU, Memory, GPU utilization rate | |
| | Performance test | Average processing time of an algorithm model | CPU, Memory, GPU utilization rate | |
| Algorithm launch state detection | Function verification | Detect XX passed algorithms, and XX failed algorithms | | |

In Table 1, the test stake can be considered as a tested case, and each test case includes an actual input, an expected output and an actual output. If the actual output is consistent with the expected output, this test case is considered to be passed. Each test case is verified for functional items.

As shown in Table 2, comparison outputs of some algorithm metrics in different dimensions and different scenarios are listed according to deployment modes.

TABLE 2

| Classification by deployment mode | Metric dimension | Applicable scenario | Metric item |
|---|---|---|---|
| Privatization deployment | 1, Compare algorithm metrics in different hardware resource configurations (e.g., single machine/group, single GPU card/a plurality of GPU cards, different kinds of GPU cards) | For example, security monitoring, privatization deployment, which needs moderate optimal server resource configuration and matched quantity of cameras | Algorithm accuracy, throughput, supportable maximal concurrent input, etc. |
| Cloud deployment | 1, Compare algorithm metrics in different algorithm versions; 2, Basic test of algorithm API interface: parameter, process, processing time, concurrency | For example, algorithm capability of an algorithm open platform provides a user with an open algorithm access interface; for another example, for AI algorithm capability of an All-in-one terminal, a cloud algorithm provides a response result, which has requirements on an algorithm result and the response result | Accuracy, average processing time, total pass-rate of an API interface basic test, API interface concurrency amount, etc. |
| Edge end deployment | 1, Compare algorithm metrics of different system configurations of a same edge end; 2, Compare algorithm metrics of different edge ends | For example, an edge AI box product of an AI edge application needs to focus on algorithm performances under inputting by a plurality of cameras, e.g. competitive analysis, and needs to focus on the algorithm performance of the same input | Model accuracy, processing time, computation, supportable maximal concurrent input, etc. |
| Terminal deployment | 1, Compare algorithm performances of different terminal AI chips; 2, Compare algorithm performances in different algorithm versions | For example, All-in-one terminal product, cursive recognition scenario | Algorithm accuracy, processing delay, etc. |

As shown in Table 3, a comparison output of some algorithm metrics in different dimensions and different scenarios is listed according to application scenarios.

TABLE 3

| Classification by deployment mode | Metric dimension | Applicable scenario | Metric item |
|---|---|---|---|
| OCR card recognition algorithm model | 1. OCR business card recognition 2. OCR identity card recognition 3. OCR business license recognition | Application scenario which needs a business card, an identity card, or a business license | Algorithm accuracy, Average processing time, etc. |
| Face recognition algorithm model | Camera information (e.g., model, height, angle, resolution, focal length), picture scenario information (e.g., crowd density, posture, occlusion, etc.), environment information (e.g., indoor/outdoor, day/night, sunny/cloudy), etc. | Application scenario which needs face recognition | Algorithm accuracy, Average processing time, etc. |
| Gesture recognition algorithm model | 1, Hand shape (e.g, L shape, fist, palm, etc.) 2, Color (white, black, yellow) | Application scenario which needs gesture recognition | Algorithm accuracy, Average processing time, etc. |
| . . . | . . . | . . . | . . . |

As shown in Table 4, a comparison output of some algorithm metrics in different dimensions and different scenarios is listed according to application scenarios:

TABLE 4

| Customized scenario | Metric dimension | Applicable scenario | Metric item |
|---|---|---|---|
| Camera Focal length and recognition distance test | Compare corresponding algorithm recognition distances in case of a same camera at a same height, angle, resolution, focal length and different focal lengths | Product research | Recognition distance, focal length |
| Algorithm accuracy metric test in different quantity of algorithm paths and at different crowd picture densities | Compare accuracies of a same algorithm in case of a same camera configuration and different crowd densities | Algorithm service resource evaluation | Quantity of algorithm paths, crowd density, algorithm accuracy, processing efficiency |
| Algorithm accuracy test of a same algorithm at different illumination and in different occlusion areas | Compare accuracies of a same algorithm in case of different illuminations and different occlusion areas | Algorithm model fineness evaluation which can be used for competitive test, algorithm model iteration test | Occlusion area, algorithm accuracy |
| Recognition accuracies of a same algorithm at different distances | Compare accuracies of a same algorithm at different distances | Algorithm model fineness evaluation which can be used for competitive test, algorithm model iteration test | Distance, Algorithm accuracy |
| metric of a same algorithm model after a plurality of iterations | 1. Compare performances of different versions of a same algorithm model on a same test data set 2. Compare the performances of a same version of a same algorithm model on test | Model development, iteration effect evaluation | Version number, model evaluation metric |

TABLE 4-continued

| Customized scenario | Metric dimension | Applicable scenario | Metric item |
|---|---|---|---|
| | data sets of different dimensions | | |
| ... | ... | ... | ... |

Algorithm metrics based on business scenario definition are often incomplete or over-defined. The business application of the algorithm is complex and diverse. The same algorithm can be applied to a variety of services, and the same service may also need multiple algorithms. There is no unified online channel on a business side to understand metric item definition of the algorithm. Due to lack of comprehensive understanding of algorithm evaluation criteria, some algorithm metrics defined based on business scenarios are not fully defined or over-defined, which affects comprehensiveness of algorithm evaluation and increases cost consumption of a research and development process.

The algorithm test platform in an embodiment of the present disclosure preserves the test process on a whole algorithm generation process link (model inference, encapsulation and deployment), and many test processes can be used as experience and historical product expectation of subsequent algorithm development. In addition, the algorithm test platform in an embodiment of the present disclosure subdivides the metric items of each type of the test task according to long-term test experience. When selecting algorithm metrics, results of historical algorithm test tasks recommended by the algorithm test platform can be used as a reference, so as to obtain a more comprehensive evaluation result of the algorithm metrics.

Current technologies lack a unified algorithm metric output platform that is convenient for business users to make decisions. According to the algorithm test platform in an embodiment of the present disclosure, the algorithm metrics are verified following the business scenario, and after verification processes of a same algorithm in different business applications are unified to complete the metric aggregation, scenario metric comparison and template output can be performed, which is convenient for a business layer to know a latest performance and an evaluation dimension of the existing algorithm in different businesses and helps to make business decisions.

For example, face detection and recognition algorithms may be applied to different scenarios such as parks, finance, transportation, retail, etc. Each scenario has its own subdivision characteristics. For example, these subdivision characteristics include: indoor/outdoor, camera 800 w/400 w, camera height 2~3 m/1.5 m, etc. By verifying a subdivided data set of each business scenario, performances of a face detection algorithm in different scenarios can be obtained, which can provide detailed data support for subsequent projects, product selection, business location and the like.

In some exemplary implementations, when the test task is an algorithm model test, the algorithm model related parameters include a container environment address and a download address of the tested algorithm. The test preparation includes:

- applying for allocating system resources according to the system resource demand parameters;
- according to the container environment address and the download address of the tested algorithm, downloading the operation environment and the tested algorithm model to compile, deploy and start; and
- loading the model test data set.

The algorithm test platform in an embodiment of the present disclosure combines with the algorithm development platform and the algorithm open platform to solve a shortage of a one-stop algorithm automatic launch, customizes a test flow for a launch process, and can plan an optimal test path to adapt a service line of algorithm development. 2) Double test tasks (algorithm model test and algorithm interface test) are arranged, and an algorithm smoke test and a whole process test are traversed to further ensure the algorithm quality.

The algorithm smoke test and the whole process test are names in different stages of the test process. At a beginning of the algorithm model or the interface test, smoke test can be performed at first, so as to detect whether the algorithm model or interface can be used normally, and then the whole process test can be performed on the algorithm model or interface.

The algorithm test platform in an embodiment of the disclosure can simultaneously complete the algorithm model test, the algorithm interface test and the launched algorithm operation state detection, so that the algorithm test platform can achieve one-stop algorithm API launch automatic test.

I) Algorithm Model Test

The algorithm development platform generates the algorithm model and issues the algorithm model test task to the algorithm test platform. The algorithm test platform completes algorithm metric verification at this time, and feeds back a result of the test task to the algorithm development platform, and saves test process information at the same time.

The algorithm model test task is selected as a test input. The task parameters should include a download address of a container (docker) environment running the algorithm model, a download address of a packaged object to be tested (including an algorithm network structure, parameter files, inference codes supporting open input and output, etc.), system resource requirements (including GPU quantity & model, CPU, memory, storage, etc.), and default metric item expectations (such as algorithm accuracy and average processing time).

A test execution start time, an algorithm model name, a comparison result of an actual metric of an algorithm model (a tested result, whether it meets the standard), and an average resource occupation (average GPU/CPU utilization rate, CPU, memory, storage utilization rate, etc.) are selected as test outputs.

Figure 8A:
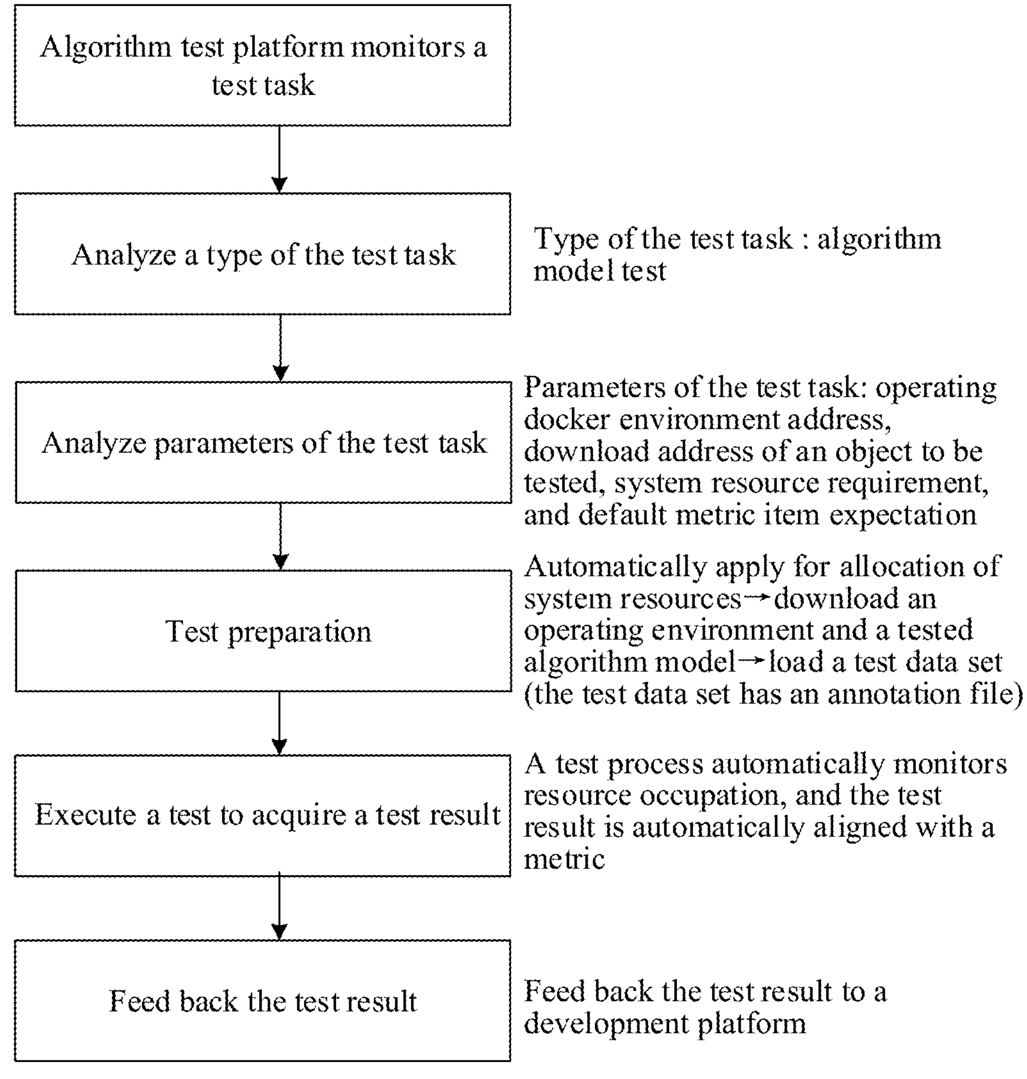
FIG. 8A is a schematic diagram of a test process of an algorithm model test provided in an exemplary embodiment of the present disclosure.

As shown in FIG. 8A, a test execution process of the algorithm model test includes:

- an algorithm test platform monitors a test task;
- the algorithm test platform analyzes a type of the test task as the algorithm model test;
- parameters of the test task are analyzed, wherein the parameters of the test task include an operating docker environment address, a download address of the object to be tested, a system resource requirement, and a default metric item expectation;

- a test preparation is performed, including automatically applying for allocation of system resources, downloading the operating environment and the tested algorithm model, and loading the model test data set (the model test data set has an annotation file);
- the test is executed and a test result is obtained: the test process automatically monitors the resource occupation, and the test result is automatically aligned with the metrics; and
- the test result is fed back: the test result is fed back to an algorithm development platform.

In an embodiment of the present disclosure, by feeding back the test result to the algorithm development platform, an algorithm developer is enabled to adjust the algorithm to be tested according to the test result, and accelerate a research and development process of the algorithm. In addition, in an embodiment of the present disclosure, the test result can also be fed back to the algorithm development platform, so that algorithm developers are enabled to adjust the parameters of the algorithm to be tested in the test process, conveniently achieve the algorithm parameter adjustment function, and accelerate the research and development process of the algorithm.

II) Algorithm Interface Test

After the algorithm development platform determines that the algorithm model meets a launch standard, algorithm interface encapsulation is completed and a request for building an algorithm interface is submitted to the algorithm open platform. After a management background of the algorithm open platform completes configuration of the algorithm launch, it sends the test task to the algorithm test platform. The algorithm test platform completes the algorithm interface test and feeds back the test result to the algorithm open platform. According to the test result, the algorithm open platform completes launch audit and finally completes launch.

The algorithm interface test task is selected as a test input. This task parameter should include an algorithm call link, algorithm call parameter information, and a test metric expectation (such as an average processing time, a system resource occupancy, etc.).

A test execution start time, an algorithm interface name, an algorithm interface test result (performing X verifications, X successful verifications, X failed verifications), an average resource occupation (average GPU/CPU utilization, CPU, memory, storage utilization, etc.), an average processing time, and whether it has passed this test verification are selected as test outputs.

Figure 8B:
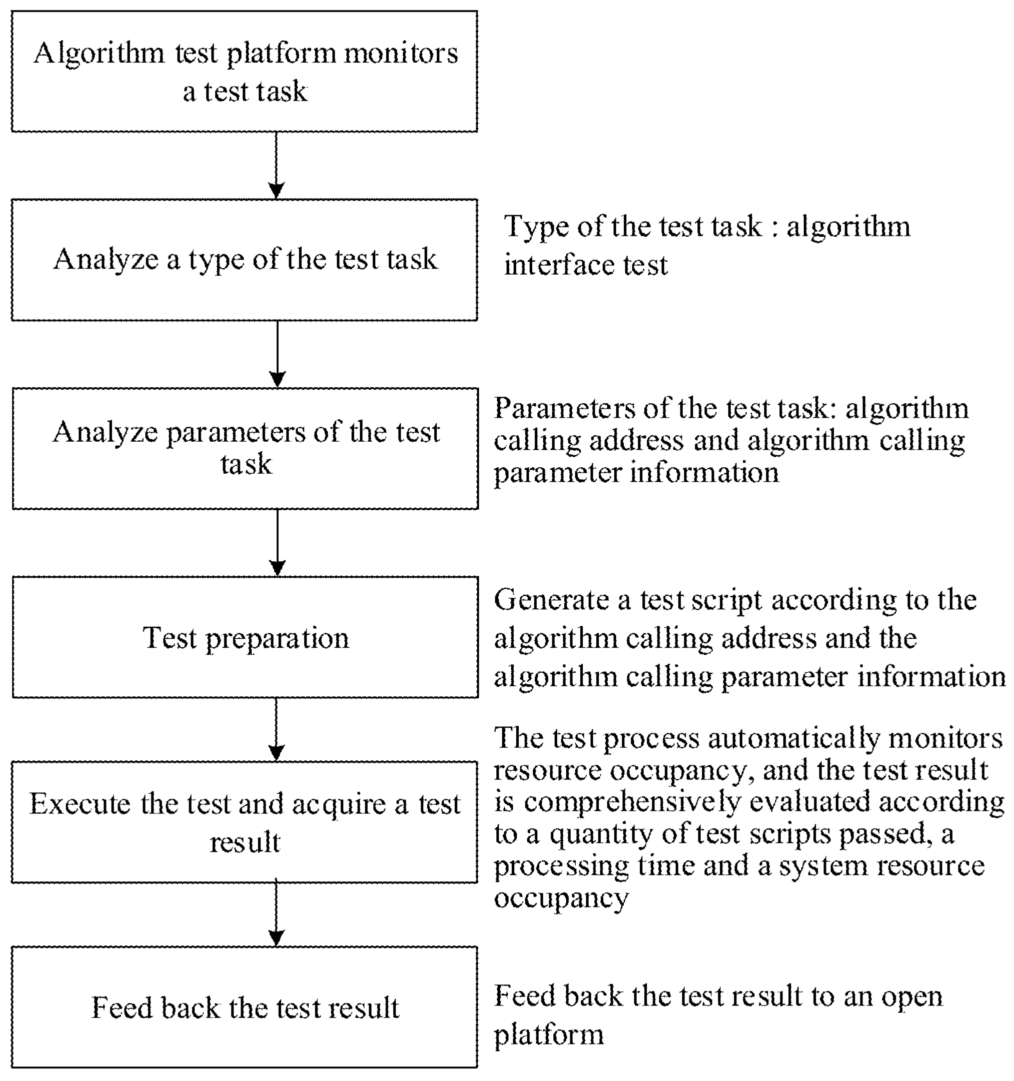
FIG. 8B is a schematic diagram of a test process of an algorithm interface test provided in an exemplary embodiment of the present disclosure.

As shown in FIG. 8B, a test execution process of the algorithm interface test includes:

- an algorithm test platform monitors a test task;
- the algorithm test platform analyzes a type of the test task as the algorithm interface test;
- parameters of the test task are analyzed, wherein the parameters of the test task include an algorithm calling address and algorithm calling parameter information;
- a test preparation is performed, including generating a test script according to the algorithm calling address and the algorithm calling parameter information;
- the test is executed and a test result is acquired. The test process automatically monitors the resource occupancy, and the test result is comprehensively evaluated according to a quantity of test scripts passed, a processing time and a system resource occupancy;
- the test result is fed back: the test result is fed back to an algorithm open platform.

III) Algorithm Online Operation State Test

After the algorithm open platform completes the algorithm launch, it sends the online algorithm operation state detection task to the algorithm test platform, the algorithm test platform completes the online algorithm operation state detection and feeds back the detection result to the algorithm open platform.

An online algorithm operation state detection task is selected as a test input, and the task parameters should include an algorithm calling address and the algorithm call parameter information.

A test execution start time, an algorithm interface name list, an algorithm interface test result (checking X algorithms, X successful algorithms, X failed algorithms, a failed algorithm list X), an average processing time, and whether it has passed this test verification are selected as test outputs.

Figure 8C:
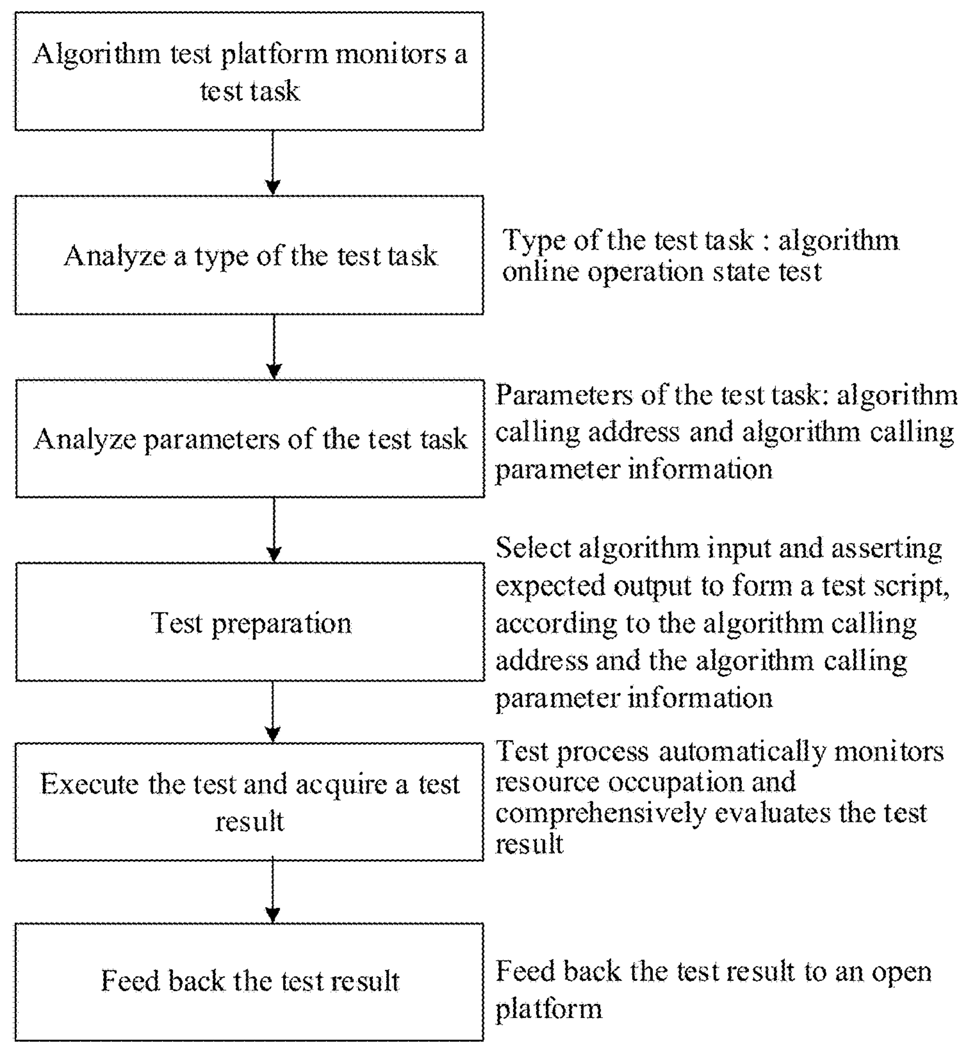
FIG. 8C is a schematic diagram of a test process of an algorithm online operation state test provided in an exemplary embodiment of the present disclosure.

As shown in FIG. 8C, a test execution process of the algorithm online operation state test includes:

- an algorithm test platform monitors a test task;
- the algorithm test platform analyzes a type of the test task as the algorithm online operation state test;
- parameters of the test task are analyzed, wherein, the parameters of the test task include an algorithm calling address and algorithm calling parameter information;
- a test preparation is performed, including selecting algorithm input and asserting expected output to form a test script, according to the algorithm calling address and the algorithm calling parameter information; and
- the test is executed and a test result is obtained, the test process automatically monitors the resource occupation and comprehensively evaluates the test result;
- the test result is fed back: the test result is fed back to an algorithm open platform.

Other applicable scenarios (e.g., online training and remote updating of models, online pruning and remote upgrading of models, etc.) can be added to the test task execution of the algorithm test platform to complete online regression test and improve delivery efficiency.

Figure 9A:
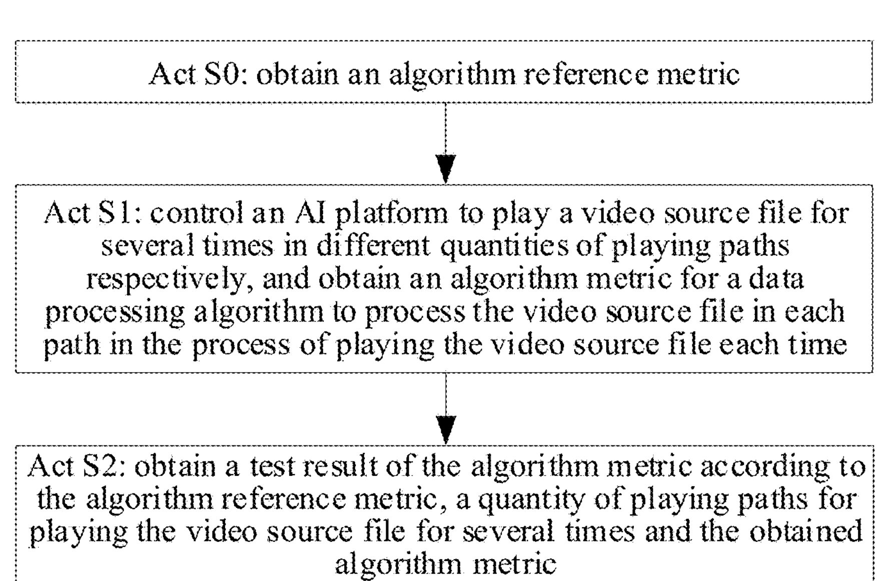
FIG. 9A is a flowchart of a method for testing an algorithm metric provided in an exemplary embodiment of the present disclosure.

As shown in FIG. 9A, a flowchart of a method for testing an algorithm metric provided in an exemplary implementation of the present disclosure, the method for testing the algorithm metric may include acts S0 to S2.

In the act S0, an algorithm reference metric is obtained.

In the act S1, an AI platform is controlled to play a video source file for several times in different quantities of playing paths respectively, and an algorithm metric for the data processing algorithm to processing the video source file in each path in the process of playing the video source file each time is obtained.

In the act S2, a test result of the algorithm metric is obtained according to the algorithm reference metric, a quantity of playing paths for playing the video source file for several times and the obtained algorithm metric.

In an embodiment of the present disclosure, the AI platform may include a test device accessing an algorithm test platform, such as cloud devices, server resources (with CPU and GPU), terminal devices, edge devices and the like.

In an exemplary implementation, the algorithm metric may include at least one of the following: a quantity of alarm messages, an average processing frame rate, a pixel position of alarm picture detection box, a system resource occupancy rate and an alarm message file.

The act S0 may include playing the video source file for several times through the offline algorithm, obtaining an offline algorithm metric output for several times by the offline algorithm, calculating an average value of all offline algorithm metrics obtained for several times, and obtaining the algorithm reference metric. Or, the act S0 may include obtaining a pre-stored algorithm reference metric from the algorithm test platform.

The algorithm reference metric may include at least one of the following: a quantity of reference alarm messages, a reference average processing frame rate, a reference pixel position of the alarm picture detection box, a system resource reference occupancy rate, and a reference alarm message file.

In an embodiment of the present disclosure, in the above act S1, the AI platform is controlled to play a video source file several times in different quantities of playing paths respectively, which can be executed in two manners. In a first manner, the AI platform is controlled to inform the streaming media service to convert the video source file into one or more video streams, and the AI platform plays one or more video streams. In a second manner, the AI platform is controlled to obtain a corresponding video source file directly according to an address of the video source file, and the AI platform plays the video source files without converting the video source files through the streaming media services. In an actual application of accessing to a camera, a video file of the camera is usually converted into a video stream through the streaming media, and then the video stream is played by the AI platform according to the video stream. Therefore, the AI platform is controlled to play the video source file several times in different quantities of playing paths in the act S1, wherein it is closer to an application scenario of the actual camera accessing to the AI platform when processing in the first manner, which can make the test result more accurate. The streaming media service is not needed when processing in the second manner, which can reduce the test cost and improve the test efficiency to a certain extent. Because of a difference with the application scenario of accessing to the actual camera, a final test result is not as accurate as a final test result in the first manner.

In an exemplary implementation, the video source files played several times in the act S1 are a same video source file, so as to ensure that the video source files played in different quantities of paths are the same, thereby making the test result of the algorithm metric more accurate. In the act S1, when there are several playing paths for playing the video source files at one time, the video source files of several paths can be played simultaneously, and a same video source file is played in several paths, thereby ensuring that video source files played in several paths are the same, making the test result of the algorithm metric more accurate.

In an exemplary implementation, the act S1 may include:

setting a total quantity of playing paths and an initial value of the quantity of playing paths;

generating a first configuration file for the AI platform to access the video stream in a current quantity of playing paths, and validating the first configuration file, wherein the first configuration file includes a video stream address and algorithm information for processing the video stream;

sending an instruction to a streaming media service according to the video stream address in the first configuration file, wherein the instruction includes a current quantity of playing paths;

when receiving the instruction, the streaming media service acquiring a video source file, converting the video source file into a video stream in a current quantity of playing paths according to the instruction, and sending the video stream in the current quantity of playing paths to an AI platform, wherein the AI platform includes a decoding processor and a data processing algorithm;

a decoding processor in the AI platform converting the video stream in the current quantity of playing paths into picture frames, and transmitting the picture frames to the data processing algorithm corresponding to the algorithm information for processing the video stream in the first configuration file;

the data processing algorithm in the AI platform playing the video stream in the current quantity of playing paths according to the picture frames, outputting a processing result of each video stream, and taking the processing result as the algorithm metric; and updating a value of the current quantity of playing paths, determining whether an updated value of the current quantity of playing paths exceeds a total quantity of playing paths; when the updated value of the current quantity of playing paths does not exceed the total quantity of playing paths, continuing to send instructions to the streaming media service according to the video stream address in the first configuration file.

In an exemplary implementation, as shown in FIG. 9B, the act S1 may include acts A1 to A7.

In the act A1, a total quantity of playing paths and an initial value of the quantity of playing paths are set.

In the act A2, a first configuration file for the AI platform to access the video stream in a current quantity of playing paths is generated, and the first configuration file is validated, wherein the first configuration file includes a video stream address and algorithm information for processing the video stream.

In the act A3, an instruction is sent to a streaming media service according to the video stream address in the first configuration file, wherein the instruction includes a current quantity of playing paths.

In the act A4, when receiving the instruction, the streaming media service acquires a video source file, converts the video source file into a video stream in a current quantity of playing paths according to the instruction, and sends the video stream in the current quantity of playing paths to an AI platform, wherein the AI platform includes a decoding processor and a data processing algorithm.

In the act A5, a decoding processor in the AI platform converts the video stream in the current quantity of playing paths into picture frames, and transmits the picture frames to the data processing algorithm corresponding to the algorithm information for processing the video stream in the first configuration file.

In the act A6, the data processing algorithm in the AI platform plays the video stream in the current quantity of playing paths according to the picture frames, outputs a processing result of each video stream, and takes the processing result as the algorithm metric.

In the act A7, a value of the current quantity of playing paths is updated to determine whether an updated value of the current quantity of playing paths exceeds a total quantity of playing paths, and the act A3 is performed when the updated value of the current quantity of playing paths does not exceed the total quantity of playing paths.

In an exemplary implementation, before the act A5, the act S1 further includes the following acts: controlling the AI platform to decode the video stream in the current quantity of playing paths to obtain picture data, and acquiring an average processing speed for the AI platform to decode each video stream.

In the act A5, the decoding processor converting the video stream in the current quantity of playing paths into picture frames, may include: the decoding processor converts the picture data of the video stream in the current quantity of playing paths into picture frames.

In an embodiment of the present disclosure, the average processing speed for the AI platform to decode each video stream can be understood as an average frame rate, which is a quantity of frames of pictures transmitted in one second, and can also be understood as how many times a graphics processor can refresh per second, which is usually expressed by Frames Per Second (fps, a quantity of pictures updated per second).

In an exemplary implementation, in the act A7, determining that the updated value of the current quantity of playing paths exceeds the total quantity of paths for playing the video stream, further includes: obtaining the test result of the AI platform metric according to a decoding reference metric pre-stored in the AI platform, a quantity of the video streams in the process of playing the video source file for several times, and the obtained average processing speed for the AI platform to decode each video stream.

In an exemplary implementation, obtaining the test result of the AI platform metric according to the decoding reference metric in the AI platform, the quantity of the video streams in the process of playing the video source file for several times, and the obtained average processing speed for the AI platform to decode each video stream, may include acts E1 to E2.

In the act E1, whether an average processing frame rate for the AI platform to decode the video source file in each path is lower than the decoding reference metric in the process of playing the video source file each time is determined. If the average processing frame rate is lower than the decoding reference metric, it is determined that the video source file with the quantity of playing paths of this time is not supported, otherwise it is determined that the video source file with the quantity of playing paths of this time is supported.

In the act E2, according to the quantity of playing paths that the AI platform supports for each playing video source file and the quantity of playing paths for each playing, the test result of the AI platform metric is obtained.

In an exemplary implementation, the test result of the AI platform metric may include a graph of the average processing frame rate for the AI platform to decode each video stream versus the quantity of playing paths.

In an exemplary implementation, the first configuration file at least includes: the video stream address, the frame rate of playing the video stream, and the algorithm information for processing the video stream.

In the act A6, the data processing algorithm in the AI platform playing the video stream in the current quantity of playing paths according to the picture frame, may include: the data processing algorithm in the AI platform playing the video stream in the current quantity of playing paths at a frame rate of playing the video stream in the first configuration file, according to the picture frame.

In an exemplary implementation, validating the configuration file may include controlling the AI platform to restart to validate the first configuration file, or transmitting validation parameters to the AI platform to dynamically validate the first configuration file.

In an exemplary implementation, in the act A4, after the streaming media service receives the instruction, and before converts the video source file into the video stream in the current quantity of playing paths according to the instruction, the act A4 further includes restarting the streaming media service.

In an exemplary implementation, the act S2 may include: comparing a quantity of alarm messages with a quantity of reference alarm messages in each path in the process of displaying the video source file each time, and/or comparing a pixel position of an alarm picture detection box with a reference pixel position of the alarm picture detection box in each path, and figuring out the algorithm accuracy of playing the video source file each time according to a comparison result; and obtaining the test result of algorithm metrics according to a figured-out algorithm accuracy of playing the video source files for several times.

In an exemplary implementation, in the process of displaying the video source file each time, before comparing the quantity of alarm messages with the quantity of reference alarm messages in each path, and/or comparing the pixel position of an alarm picture detection box with the reference pixel position of the alarm picture detection box in each path, the act S2 may further include:

determining whether, in the process of displaying the video source file each time, the average processing frame rate in the several paths is lower than the reference average processing frame rate, determining that the quantity of playing paths for playing of this time is not supported when the average processing frame rate in the several paths is lower than the reference average processing frame rate, and determining that the quantity of playing paths for playing of this time is supported when the average processing frame rate of the several paths is not lower than the reference average processing frame rate; and determining whether the system resource occupancy rate in each path is lower than a system resource reference occupancy rate;

comparing the quantity of alarm messages with the quantity of reference alarm messages in each path in the process of displaying the video source file each time, and/or comparing the pixel position of the alarm picture detection box with the reference pixel position of the alarm picture detection box in each path, and figuring out the algorithm accuracy of playing the video source file each time according to a comparison result, may include: calculating a difference value between the quantity of alarm messages and the quantity of reference alarm messages in each path, and a difference value between the pixel position of the alarm picture detection box in each path and the reference pixel position of the alarm picture detection box in each path in the process of displaying the video source file each time, comparing whether the alarm message files are consistent with the reference alarm message files in each path, and figuring out the algorithm accuracy of playing the video source file each time according to determination, calculation and comparison results.

In an exemplary implementation, the act S2 may include:

determining whether the average processing frame rate in the several paths in the process of displaying the video source file each time is lower than the reference average processing frame rate, determining that the quantity of playing paths for playing of this time is not supported when the average processing frame rate in the several paths is lower than the reference average processing frame rate, and determining that the quantity of playing paths for playing of this time is supported when the average processing frame rate in the several paths is not lower than the reference average processing frame rate;

calculating the difference value between the quantity of alarm messages and the quantity of reference alarm messages in each path, and the difference value between the pixel position of the alarm picture detection box in each path and the reference pixel position of the alarm picture detection box in each path in the process of displaying the video source file each time, comparing whether the alarm message files are consistent with the reference alarm message files in each path, determining whether the system resource occupancy rate in each path is lower than a system resource reference occupancy rate, and figuring out the algorithm accuracy of playing the video source file each time according to determination, calculation and comparison results; and obtaining the test results of algorithm metrics according to the algorithm accuracy of playing the video source files for several times.

In an exemplary implementation, obtaining the test result of the algorithm metric according to the figured-out algorithm accuracy of playing video source files for several times may include at least one of the following: obtaining a graph of the quantity of playing paths versus the average frame rate, obtaining a graph of the quantity of playing paths versus the system resource occupancy rate, and obtaining a graph of the quantity of playing paths versus the algorithm accuracy according to the algorithm accuracy; wherein the test result of the algorithm metric may include at least one of the following: a graph of the quantity of playing paths versus the average frame rate, a graph of the quantity of playing paths versus the system resource occupancy rate, and a graph of the quantity of playing paths and the algorithm accuracy.

In an exemplary implementation, calculating the difference value between the quantity of alarm messages and the quantity of reference alarm messages in each path, and the difference value between the pixel position of the alarm picture detection box in each path and the reference pixel position of the alarm picture detection box in each path in the process of displaying the video source file each time, and comparing whether the alarm message files are consistent with the reference alarm message files in each path, may include:

calculating the difference value between the quantity of alarm messages and the quantity of reference alarm messages in each path in the process of displaying the video source file each time, and determining that the algorithm is inaccurate when playing in the current quantity of playing paths if the difference between the quantity of alarm messages and the quantity of reference alarm messages exceeds a preset difference value;

and/or, calculating the difference between the pixel position of the alarm picture detection box and the reference pixel position of the alarm picture detection box in each path, and determining that the algorithm is inaccurate when playing in the current quantity of playing paths if the difference between the pixel position of the alarm picture detection box and the reference pixel position of the alarm picture detection box exceeds a range of the preset difference value;

and/or, comparing whether the alarm message file is consistent with the reference alarm message file in each path, and determining that the algorithm is inaccurate when playing in the current quantity of playing paths if the alarm message file is not consistent with the reference alarm message file in each path.

Determining whether the system resource occupancy rate in each path is lower than a system resource reference occupancy rate, may include: determining whether the system resource occupancy rate in each path is lower than a system resource reference occupancy rate, and determining that the algorithm is inaccurate when playing in the current quantity of playing paths if the system resource occupancy rate is not lower than the system resource reference occupancy rate.

Figuring out the algorithm accuracy of playing the video source file each time according to determination, calculation and comparison results, may include: figuring out the algorithm accuracy of playing multiple video streams in the process of displaying the video source file each time, and obtaining the algorithm accuracy according to the quantity of playing paths and the accuracy of playing the video source file for several times.

In an exemplary implementation, the system resource occupancy rate may be a CPU occupancy rate, a GPU occupancy rate and the like.

In an exemplary implementation, figuring out the algorithm accuracy of playing the multiple video streams in the process of displaying the video source file each time, may include:

during playing the video source file every time, determining a ratio of the quantity of paths with the accurate algorithm to the total quantity of playing paths.

During playing the video source file in each path, the algorithm is determined to be accurate for processing the video source file in the path when determining that each algorithm metric is algorithm-accurate, and the algorithm is determined to be inaccurate for processing the video source file in the path when determining that any algorithm metric is algorithm-inaccurate.

When launched on the algorithm open platform, the AI algorithm usually has the following characteristics: when launched in batches, the quantity of algorithms is uncertain and up to a dozen sometimes; a launch frequency is high, developers may be ready to launch at any time a day; and algorithm development sites and personnel are spread out in a plurality of locations, such as Shanghai, Beijing or overseas sites. Based on the characteristics of the algorithm launch, a manual launch detection manner has the shortages of a long time for troubleshooting problems, a high labor cost, a long problem feedback period and a long problem regression feedback period.

In an exemplary implementation, in order to solve the problems of the long time for launch troubleshooting and the high labor cost of the existing AI algorithm, before the AI platform plays the video source file in different quantities of playing paths for several times, the following act can be further included: automatically detecting a plurality of AI algorithms on the AI platform, wherein the AI platform includes a plurality of AI algorithms, and the plurality of AI algorithms include the aforementioned data processing algorithm.

In an exemplary embodiment, automatically detecting the plurality of AI algorithms may include:

automatically acquiring a plurality of AI algorithm codes to be tested from the tested algorithm code repository, performing checking on each metric for the plurality of AI algorithm codes, and sending corresponding abnormal information to the algorithm test platform if any metric is abnormal;

when there is no abnormal metric check of the plurality of algorithm codes, checking a startup state of the AI platform, and sending abnormal startup information of the AI platform to the algorithm test platform when an abnormal startup of the AI platform is detected; and when there is no abnormal startup of the AI platform, controlling the AI platform to start the plurality of AI algorithms, checking the operation state of the plurality of AI algorithms; when there is an abnormal operation state of the plurality of AI algorithms, sending information of an abnormal operation state of the algorithms to the algorithm test platform.

In an exemplary implementation, after automatically acquiring a plurality of AI algorithm codes to be tested from the tested algorithm code repository, automatically detecting the plurality of AI algorithms may further include: generating a configuration reference file according to the plurality of AI algorithm codes, and generating a second configuration file based on the configuration reference file.

The configuration reference file includes algorithm names, algorithm model parameters of the plurality of algorithms, path parameters of a database needed for algorithm operation, resource configuration parameters, and video stream information as an algorithm input, wherein the video stream information includes algorithm names, algorithm strategy information and a frame rate threshold of a plurality of AI algorithms.

In an exemplary implementation, generating the second configuration file based on the configuration reference file may include: generating a second configuration file in CSV format according to contents of the configuration reference file, wherein the second configuration file includes algorithm basic information and algorithm input information. The basic information includes the algorithm name, the algorithm model parameters, the path parameters of database needed for algorithm operation, and the resource configuration parameters. The algorithm input information includes the video stream information.

In an exemplary implementation, checking each metric of the plurality of AI algorithm codes, may include:

checking whether the algorithm name in the algorithm input information in the second configuration file is consistent with the algorithm name in the algorithm basic information, and feeding back the abnormal information of the second configuration file to the algorithm test platform when checking that the algorithm name in the algorithm input information in the second configuration file is inconsistent with the algorithm name in the algorithm basic information;

when checking that the algorithm name in the algorithm input information in the second configuration file is consistent with the algorithm name in the algorithm basic information, obtaining a compilation instruction from the tested algorithm code repository, and automatically calling a compilation interface according to a compilation instruction to compile the plurality of AI algorithms; acquiring a compiling log, checking whether there is an error in the compiling log, and feeding back information on compiling abnormally to the algorithm test platform when checking that there is an error in the compiling log;

after checking that the algorithm name in the algorithm input information in the second configuration file is consistent with the algorithm name in the algorithm basic information, checking each metric of the plurality of AI algorithm codes further includes: according to the second configuration file, checking whether a model file needed by an AI algorithm launched this time is prepared correctly; feeding back abnormal model information to the algorithm test platform if the model file is not prepared correctly.

In an exemplary implementation, checking the startup status of the AI platform may include:

starting the AI platform, waiting for a first preset time, checking whether a process of the AI platform is started, and sending abnormal start information of the AI platform to the algorithm test platform when the process of the AI platform is not started; when checking that the process of the AI platform is started, starting a plurality of AI algorithms on the AI platform to check the operation state of the plurality of AI algorithms.

In an exemplary implementation, starting the plurality of AI algorithms on the AI platform to check the operation state of the plurality of AI algorithms, includes:

controlling the AI platform to start a thread group corresponding to the plurality of AI algorithms;

controlling the AI platform to read the second configuration file and adding an AI algorithm to be detected which is recorded in the second configuration file to the thread group;

controlling the AI platform to run the plurality of threads in the thread group, and sending information on abnormal operation of a corresponding AI algorithm to the algorithm test platform when any AI algorithm of the plurality of threads runs abnormally;

starting a summarization thread, summarizing detection results, and sending the summarized detection results to the algorithm test platform.

In an embodiment of the present disclosure, by automatically checking the operation state of the plurality of AI algorithms (i.e., batch algorithm), in a detection process before the batch algorithm launch, manual launch detection is not needed, thus avoiding the defects of a long time for algorithm detection and troubleshooting problems, a long problem feedback period and a long problem regression feedback period, reducing labor cost and improving detection efficiency to a great extent.

In an exemplary implementation, when the operation state of the plurality of AI algorithms is not abnormal, starting the plurality of AI algorithms on the AI platform to check the operation state of the plurality of AI algorithms, further includes launching codes of the plurality of AI algorithm on the algorithm open platform.

In an exemplary implementation, before automatically triggering the automatic detection of the plurality of AI algorithms, triggering periodic detection is further included.

In an embodiment of the present disclosure, flow control can be performed on the above operations by a test script that can be run on the AI platform.

Figure 9C:
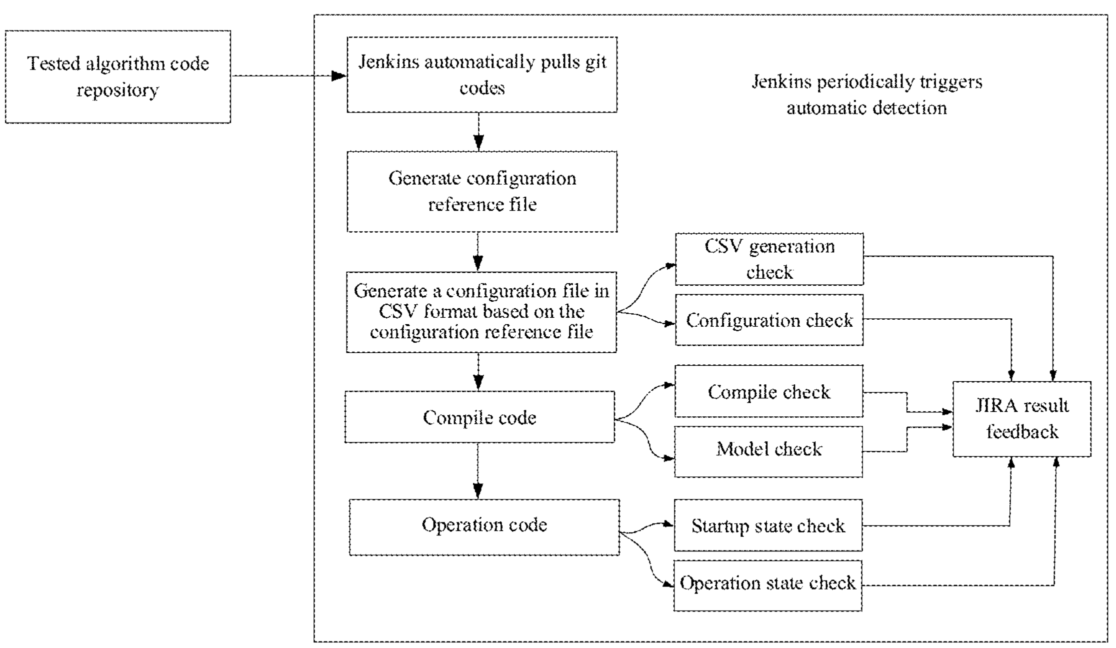
FIG. 9C is a schematic diagram of a logical architecture for AI algorithm detection provided in an exemplary embodiment of the present disclosure.

In an exemplary implementation, as shown in FIG. 9C, it is a schematic diagram of a logical architecture of an algorithm test platform performing AI algorithm detection according to an exemplary embodiment of the present disclosure, and the algorithm test platform periodically triggers automatic detection through Jenkins. In the logical architecture shown in FIG. 9C, after completing the model development and strategy development, research and development personnel submit the algorithm to the tested code repository, and the algorithm test platform periodically triggers the automatic detection of the algorithm in the tested code repository through the Jenkins. Algorithm detection contents can include configuration detection, compilation detection, model detection, AI platform startup state detection and algorithm operation state detection.

Figure 9D:
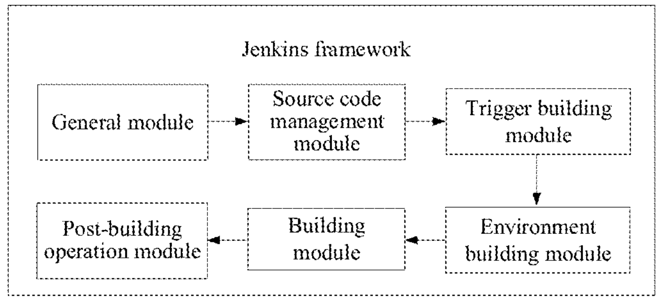
FIG. 9D is a schematic diagram of a Jenkins framework structure provided in an exemplary embodiment of the present disclosure.

As shown in FIG. 9D, the Jenkins framework can include six configuration modules:

General module: building some basic configurations of a task, discarding old building, and setting a preservation strategy of a building history; selectively setting a parameterized building process to configure different parameters, so that the parameters can be used while building.

Source code management module: selecting a GIT and setting a corresponding GIT parameter. In an exemplary embodiment, setting the GIT parameter may be setting a GIT address that may be an SVN address for accessing the tested code repository.

Trigger building module: selecting timing building and setting a corresponding time parameter. Then the trigger building module can trigger a test periodically.

Environment building module: selecting a build tool named as Delete workspace before build starts.

Building module: typically, an environment for the building module is writing execution files. The building module is not set in the embodiments of the present disclosure.

Post-building operation module: achieved by designing a calling command and compiling scripts.

According to a period set by the trigger building module and GIT parameters set by the source code management module, algorithm codes are pulled periodically from a GIT address for testing.

An algorithm detection method is described in detail below.

(1) Jenkins automatically pulling git codes: when the test period is reached, triggering periodic automatic detection, and the algorithm test platform automatically pulling the algorithm code corresponding to a git address from the tested algorithm code repository through the Jenkins. Each algorithm code in the tested algorithm code repository should have a corresponding git address, and the algorithm test platform can access a corresponding algorithm code in the tested algorithm code repository by the git address. In an exemplary implementation, the tested code repository may be referred to as a code storage platform.

In an exemplary implementation, the algorithm test platform acquires the corresponding algorithm code by a git address. When the batch algorithm is launched or the batch algorithm is detected, a git address corresponding to the batch algorithm can be acquired from the tested algorithm code repository through the Jenkins, and a plurality of corresponding algorithm codes can be acquired according to the git address, thereby achieving the batch algorithm launching or the batch algorithm detection. In an exemplary implementation, a same git address may correspond to a plurality of algorithms in the batch algorithm, or each algorithm may correspond to a git address.

(2) Generating a configuration reference file: generating a configuration reference file according to the algorithm codes.

In an exemplary implementation, the configuration reference file may include algorithm names, algorithm model parameters of a plurality of algorithms in the batch algorithm, path parameters of a database needed for algorithm operation, resource configuration parameters, and video stream information as an algorithm input, wherein the video stream information includes corresponding algorithm names, algorithm strategy information, a frame rate threshold and other information. In an exemplary implementation, the configuration reference file may further include information on a person in charge of research and development and a person in charge of test.

In an exemplary implementation, the resource configuration parameters may include occupied CPU, GPU and other resources. For example, an algorithm needs to occupy 100 M space bits of the CPU and 50 M space bits of the GPU.

(3) Configuration files in CSV format are generated based on the configuration reference file.

In an exemplary implementation, in order to meet a format requirement of the algorithm test platform on the configuration file, a configuration file in CSV format is generated according to the configuration reference file, and the configuration file in CSV format is taken as a standard in a subsequent detection process.

In an exemplary implementation, the configuration file in CSV format may include two parts, i.e., a first part and a second part, which are arranged in sequence, wherein the first part may include basic information of a plurality of algorithms, the basic information may include the algorithm name, the algorithm model parameters, and the path parameters of the database needed for algorithm operation, and the second part may include algorithm input information that includes the video stream information. The basic information of the plurality of algorithms in the first part can be arranged in sequence, and the algorithm input information of the plurality of algorithms in the second part can be arranged in sequence.

(4) CSV generation check: checking whether the configuration file in CSV format is in a standard format specified by the algorithm test platform, and calling a JIRA interface to feed back a configuration bug of a corresponding algorithm if the configuration file in CSV format is not in the standard format specified by the algorithm test platform.

In an exemplary implementation, Comma-Separated Values (CSV) are referred to as character-separated values sometimes, because the separator character may not be a comma and its file stores tabular data (numbers and texts) in a plain text form. Plain text means that a file is a sequence of characters without data that must be interpreted like binary numbers. A file in CSV formats includes any quantity of records separated by some kind of line break. Each record is composed by fields, and the separators between the fields are other characters or strings, wherein commas or tabs are the most commonly.

In an exemplary implementation, CSV checking may include checking whether the configuration file in the CSV format meets the format requirement of the standard configuration file. For example, the format of the standard configuration file refers to that records are separated by commas, and if it is checked that records are separated by semicolons in the configuration file in CSV format, an exception occurs in CSV generation.

(5) Configuration check may include checking whether the algorithm name in the basic information of the configuration file is consistent with the algorithm name in the algorithm input information, and if the algorithm name in the basic information of the configuration file is not consistent with the algorithm name in the algorithm input information, the JIRA interface is called to feed back the configuration bug of the corresponding algorithm.

In an exemplary implementation, if some algorithms do not need an input video stream, null input video stream information can be marked in the algorithm name of the basic information. When the null input video stream information marked in the algorithm name is detected, no abnormality can be determined according to the marking, and the JIRA interface may not to be called to feed back the bug of the corresponding algorithm.

In an exemplary implementation, even some algorithms do not take the video stream information as an input in an actual operating process, the video stream information is configured in a model development and strategy development process, but corresponding video stream resources are not used in the operating process. In this case, if video stream information corresponding to the algorithm name is not detected in a configuration checking process, the JIRA interface can be called to feed back a bug of a corresponding algorithm. In an exemplary implementation, the bug is a general designation for software, programs, codes, algorithms, vulnerabilities, flaws, bug issues in a computer system.

(6) Compile code: the Jenkins compiles the algorithm code by calling a compilation interface according to a compiler instruction.

In an exemplary implementation, the Jenkins acquires a compilation instruction of the corresponding algorithm according to the git address, and automatically calls the compilation interface to compile the algorithm code, which can reduce the manual deployment of a compilation environment and a manual compilation process, thereby reducing the labor cost and improving the efficiency.

(7) The compilation check can include: checking whether an algorithm compilation process reports an error and checking whether an algorithm compilation result is successful; if the compilation process reports the error or the compilation result is unsuccessful, calling the JIRA interface to feed back the compilation bug of the corresponding algorithm. In an exemplary implementation, checking whether the algorithm compilation process reports the error and checking whether the algorithm compilation result is successful may include acquiring a log compiled by the Jenkins and checking whether an error exists in a compilation log. For example, whether information such as "error" exists in the compilation log is checked.

(8) The model detection can include: according to the configuration file, checking whether the model file needed by the launched algorithm is prepared correctly; and calling the JIRA interface to feed back the model bug of the corresponding algorithm if it is detected that the model file is not prepared correctly.

In an exemplary implementation, checking whether the model file needed by the launched algorithm is prepared correctly may include: searching for whether a model file corresponding to the algorithm exists according to the model parameter in the configuration file.

In an exemplary implementation, once an abnormality occurs in the process of the CSV generation check, the configuration check and the model check, the JIRA interface service is called to automatically submit a corresponding bug to a JIRA server that displays the corresponding bug to the user through a browser, and a corresponding developer can view the corresponding bug through a corresponding browser.

In a process of manual launch, when a bug occurs in the operation and maintenance or the test, an operation and maintenance person or a testing person usually communicates with a developer, and the operation and maintenance person or the testing person does not fully understand the bug in a development process, taking a high communication cost. In an embodiment of the present disclosure, bug information is uploaded to the JIRA server through the JIRA interface, and the developer, a person in charge of a platform, the testing person or the operation and maintenance person can view the corresponding bug information by logging in a JIRA account, thus reducing the communication cost to a great extent. In an exemplary implementation, the Jenkins is an open source, user-friendly Continuous Integration (CI) tool for continuous, automated build/test software projects and monitoring an operation of an external task.

(8) Check an operation state of the AI platform.

Figure 9E:
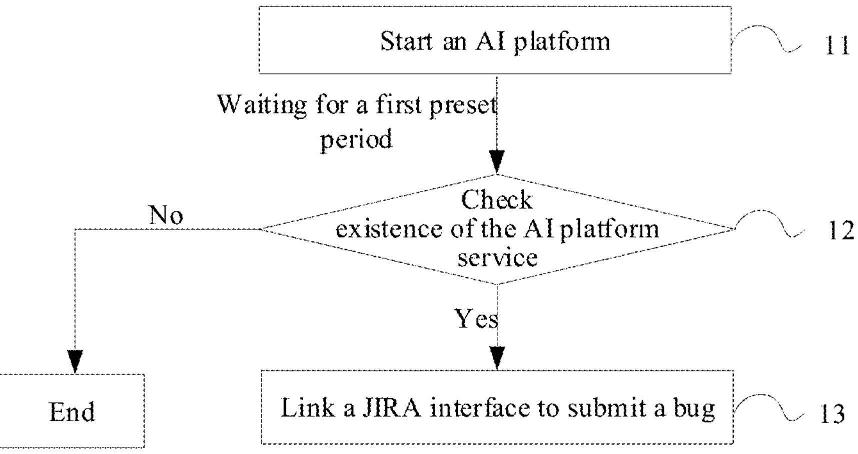
FIG. 9E is a flowchart of AI platform operation state check provided in an exemplary embodiment of the present disclosure.

As shown in FIG. 9E, checking the operation state of the AI platform may include the following acts 11 to 13.

In the act 11, an AI platform is started and the act 12 is performed after waiting for a first preset period.

In an exemplary embodiment, the first preset period may last for 1 minute to 5 minutes. For example, the first preset period may be 3 minutes.

In an exemplary implementation, the AI platform can be started after the code is compiled, check of the operation state of the AI platform can be started after the compiling check and the model check are performed, check of the operation state of the AI platform is started and the act 12 is performed after waiting for a first preset period.

In the act 12, existence of the AI platform service is checked. If the AI platform service exists, the check is finished, otherwise the act 13 is proceeded.

In an exemplary implementation, existence of the AI platform service is checked to determine whether a process of the AI platform is started, the act 13 is performed if the process is not started, otherwise the check is finished.

In the act 13, the JIRA interface is linked to submit the bug.

In the act 13, the AI platform startup exception is submitted to the JIRA server through the JIRA interface, and users (a person in charge of AI platform or a developer) can log in the JIRA server to view the corresponding bug and solve a corresponding problem. In an embodiment of the present disclosure, the JIRA server can serve as the abovementioned algorithm test platform.

(9) Check an operation state of the algorithm.

Figures 9F, 10A, 10B, 10C:
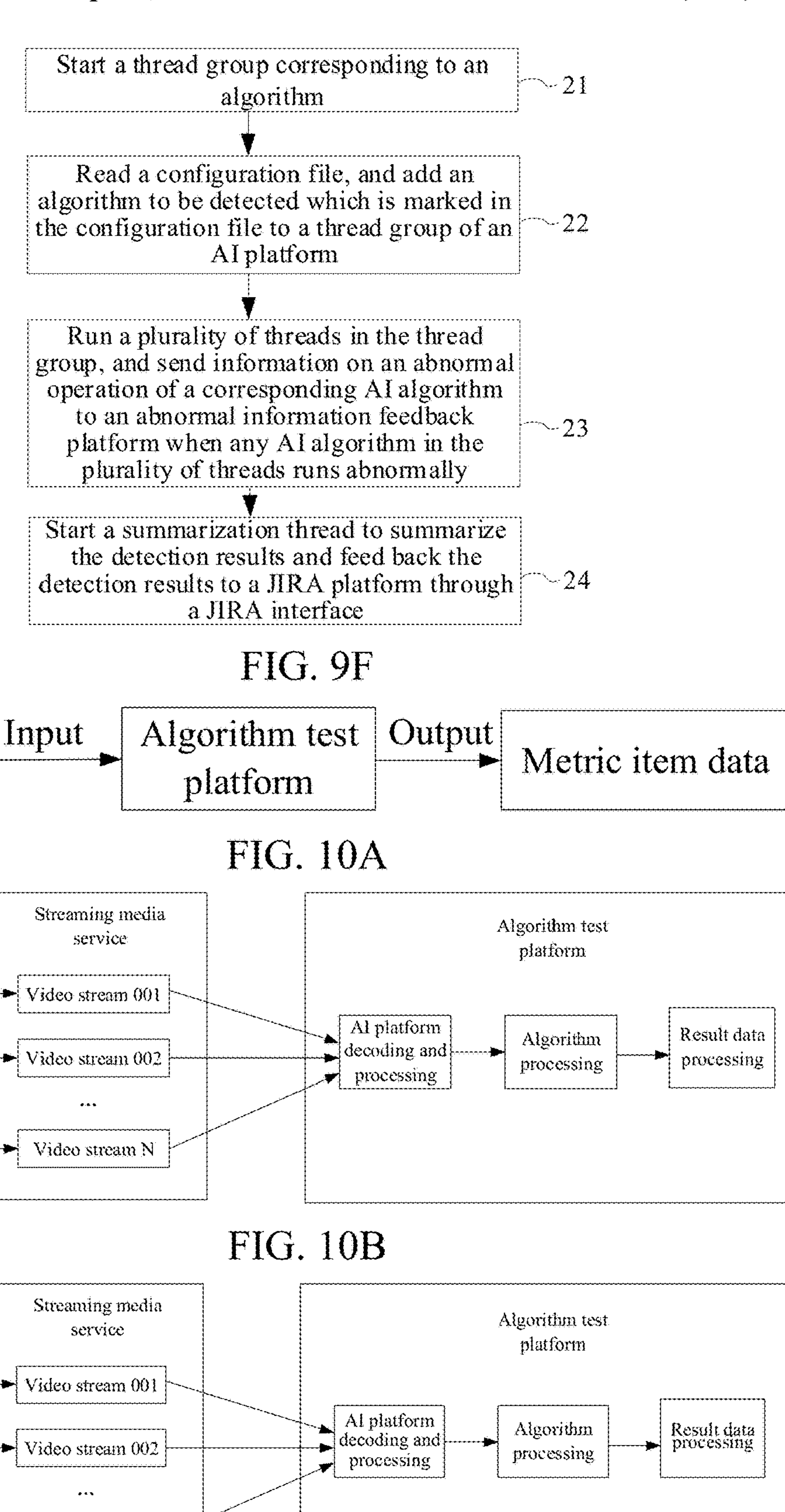
FIG. 9F is a flowchart of AI algorithm operation state check provided in an exemplary embodiment of the present disclosure.
FIG. 10A is a schematic diagram of a logical structure of an algorithm metric test provided in an exemplary embodiment of the present disclosure.
FIG. 10B is a schematic diagram of a logical framework of video source processing provided in an exemplary embodiment of the present disclosure.
FIG. 10C is a schematic diagram of a logical framework of video source processing provided in an exemplary embodiment of the present disclosure.

As shown in FIG. 9F, checking the operation state of the AI algorithm may include the following acts 21 to 24.

In the act 21, a thread group corresponding to the algorithm is started.

In an exemplary implementation, an operation of starting an algorithm can be performed after the process in the AI platform is started.

In an exemplary implementation, starting the algorithm includes starting threads corresponding to the quantity of algorithms after an AI platform process is started. When a plurality of algorithms are started, each algorithm corresponds to an thread, and a thread group including a plurality of threads is started in the process.

In the act 22, the configuration file is read, and an algorithm to be detected which is marked in the configuration file is added to the thread group of the AI platform.

In an exemplary implementation, in the process of batch algorithm testing or batch algorithm launching, only a part of the algorithms can be added to a current thread group due to limited resources of the thread group, and remaining algorithms can be added to other thread groups or tested in a next test. In an exemplary implementation, all algorithms recorded in the configuration file may be detected by default without setting an identification as to whether the detection is needed.

In an exemplary implementation, each algorithm is loaded into one of the threads in the thread group. That is, each algorithm may correspond to a thread.

In the act 23, a plurality of threads in the thread group are run, and information on abnormal operation of a corresponding AI algorithm is sent to the algorithm test platform when any AI algorithm in the plurality of threads runs abnormally.

In an exemplary implementation, when abnormality of an algorithm is detected, the JIRA interface is linked, a bug is submitted and fed back to a JIRA service platform (i.e., the algorithm test platform), and a person in charge of the algorithm can log in the algorithm test platform, view a JIRA bug and process corresponding algorithm abnormality.

In an exemplary implementation, an output result of the algorithm can be obtained when no abnormality occurs in a detection result after performing algorithm detection.

In the act 24, a summarization thread is started to summarize the detection results and feed back the detection results to the algorithm test platform through the JIRA interface.

In an exemplary implementation, the configuration file may include a mailbox address of the person in charge of research and development or the person in charge of test. After the algorithm test platform receives the corresponding bug, the corresponding bug information can be sent to a corresponding person in charge of research and development or a person in charge of test according to the mailbox address.

In an exemplary implementation, the summarization thread feeds back a total detection result to the algorithm test platform through the JIRA interface, and the person in charge of research and development or the person in charge test logs in the algorithm test platform to acquire the detection result, and determines whether an algorithm launch result meets an expectation according to the detection result. In an exemplary implementation, the total detection result may include a total quantity of codes of the detected algorithms, a quantity of successful algorithm tests, a quantity of fail algorithm tests, a success list, and a failure list.

In an exemplary implementation, if there is a bug in an algorithm detection process performed by the threads, the test is considered as an unsuccessful test, and corresponding bug information is uploaded to the algorithm test platform through the JIRA.

In an exemplary implementation, the success list contains a list of algorithms for which an algorithm test is successful, and the failure list contains a list of algorithms for which an algorithm test is failed.

In an exemplary implementation, the person in charge of research and development or the person in charge of testing determines whether the algorithm launch result meets the expectation according to the detection result, and can make a determination according to a type of an algorithm which is detected as a fail or successful algorithm. For example, there are 21 algorithms in total for batch testing. If there is one algorithm tested to be abnormal, after evaluation, the abnormal algorithm is not needed to be launched this time, and only 20 successful algorithms can be launched, and the algorithm test meets the expectation. If there are 21 detected algorithms in total, and one algorithm which is necessary for launching is abnormal, the algorithm test cannot meet the expectation and the algorithms cannot be launched. It is necessary for a corresponding person in charge of research and development to solve a corresponding bug and then retest. That is, the above-mentioned (1) to (9) of the detection process repeat, until the test meets the expectation.

In an exemplary implementation, the detection result is submitted to the algorithm test platform automatically, achieving a streamline function without a manual operation, thereby saving labor costs.

In an exemplary implementation, the detection result may include a detection log and an exception record, and the detection log may include a detection time as well as the success list and the failure list described above. For example, the detection log is as follows:

```
2021-10-18 16:10:25 [model_repository2] auto test end ! total:
16 failed: 7
FAILED LIST: ['highway_lowspeed', 'drive_without_license',
drive_license_without_permission', 'drive_inout', 'driver_car_match',
'station_leave', 'wandering_alarm']
NEW JIRA LIST: [ ]
YF2021430-131
```

Detection end time recorded in the above-mentioned detection log is 16:10:25 on Oct. 18, 2021, with a total detection quantity of 16 and a failure quantity of 7. Algorithms which are detected as fail algorithms in the failure list include: 'highwayjowspeed', 'drive_withoutjicense', 'drive_license_without_permission', 'drivejncut', 'driver_car_match', 'stationjeave' and 'wandering_alarm'

A summary of the exception log includes:

[AI300OnlineCheck: C-Video] [check.ConfigCheckLog] ERRORBUG exists in vehiclebreakin

[AI300OnlineCheck: C-Video] [CHECK_CompileCheckLog] ERRORBUG exists in Non VehicleIllegalParkingDetect

[A1300OnlineCheck: C-Video] [check_ConfigCheckLog] ERRORBUG exists in vehiclebreakin In an exemplary implementation, the Jenkins can integrate with automatic launch detection which is set to run regularly, so as to improve the detection efficiency. For example, an automatic launch detection service can be run periodically at 11:30 a.m. and 16:30 p.m. on the Jenkins every working day, which is convenient for launching the algorithms in the morning or afternoon.

In an embodiment of the present disclosure, the algorithm runs on the algorithm open platform to provide a message interface for services, and one or more cameras may need to access an actual business scenario. If platform resources are insufficient, video stream processing failure, service crash and other problems may occur. In order to avoid the video stream processing failure, the service crash and other problems caused by insufficient platform resources after access, the algorithm metric can be tested when a plurality of cameras access after no abnormal occurs during the algorithm detection and the algorithm is launched successfully and before the plurality of cameras access. In an exemplary implementation, when the plurality of cameras access under a single card/single machine configuration, the algorithm metric can be tested, so as to acquire a graph of the algorithm metric value versus the quantity of cameras in an existing service configuration of the platform, which has data significance for the advance planning and design of product achievement and resource configuration. In an embodiment of the present disclosure, the single card can refer to a Graphics Processing Unit (GPU), which is also referred to as a display core, a visual processor or a display chip, and the single machine can be a physical machine configured with a plurality of GPU cards.

In an embodiment of the present disclosure, logic of the algorithm metric test is shown in FIG. 10A, and the video stream, the algorithm test platform and the metric item data are described below.

Video stream: an input source of the algorithm test platform. The multiple video streams can be simulated by means of a video file, or by means of converting one video stream to multiple video streams.

In an exemplary implementation, one video file can be copied into N video files, and the N video files are converted to form N video streams, respectively. Or, one video file is converted to form a video stream, and the video stream are copied to form N video streams.

Algorithm test platform: providing an algorithm service based on an AI platform framework. Input of the algorithm test platform is one or more video streams. Output of the algorithm test platform is a frame rate, a quantity of messages processed, a message file, system resource occupancy (such as a CPU occupancy rate/a GPU occupancy rate), etc. The algorithm test platform includes video stream decoding, algorithm processing, metric data recording, outputting and other functions.

The metric item data are output of the metric items needed by the algorithm test platform when processing N flows. Taking a perimeter intrusion algorithm as an example, it is needed that the output should include a quantity of alarm messages, an average processing frame rate (in fps), a pixel position of an alarm picture detection box, and a system resource occupancy rate (CPU/GPU).

In an exemplary implementation, as shown in FIGS. 10B and 10C, schematic diagrams of logical frameworks of two kinds of video source processing are shown, a video file is taken as a video source, as shown in FIG. 10B.

Streaming media service: providing a video file converting service. A video file can be converted into N video streams specified for requirements. The converted video stream is taken as a video stream input of the algorithm test platform.

Algorithm test platform: providing the algorithm services based on the AI platform framework. Specific services refer to description of the above-mentioned algorithm test platform, which will not be repeated here. Result data processing: according to an output result of the algorithm processing, performing data processing to obtain a corresponding metric relationship diagram.

As shown in FIG. 10C, a real camera is used as a video source input.

Streaming media service: providing a converting service. A video stream of a camera can be converted into N video streams specified for requirements. The converted video stream is taken as a video stream input of the algorithm test platform.

Algorithm test platform: providing the algorithm services based on the AI platform framework. Specific services refer to description of the above-mentioned algorithm test platform, which will not be repeated here. Result data processing: according to an output result of the algorithm processing, performing data processing to obtain a corresponding metric relationship diagram.

In an exemplary implementation, the obtained metric relationship diagram may include a graph of an accuracy versus a quantity of cameras.

In an embodiment of the present disclosure, the result data processing described in FIGS. 10B and 10C can employ a form described in the act S2, and the result data processing finally obtains the test result of the algorithm metric.

In an embodiment of the present disclosure, the video stream can be generated in a simulation manner, which has the following advantages compared with the video stream of a real camera:

(1) It can ensure that the input sources are consistent, and an obtained metric conclusion is comparable.

(2) It can ensure that a density of a single frame meets specific requirements, for example, a quantity of people in a single frame needs to reach 30, and a metric value of a capacity test can be obtained. However, it is difficult for a real camera to ensure the density of a single frame.

(3) It is easy to expand and construct. According to an actual requirement, the metric values in N paths (such as 8 paths, 16 paths, 32 paths and 100 paths) can be compared.

Based on the above three advantages, comparing with the case of many paths, it is difficult to use a real camera to quickly implement with respect to the quantity of cameras, purchase, construction and simulation of crowd density of a picture.

In an exemplary implementation, in two video stream simulation manners in FIGS. 10B and 10C, the video stream obtained by a video file is employed in FIG. 10B, compared with a video stream obtained by using real camera simulation in FIG. 10C, a scenario video satisfying the density of the single frame picture can be conveniently customized.

Figure 10D:
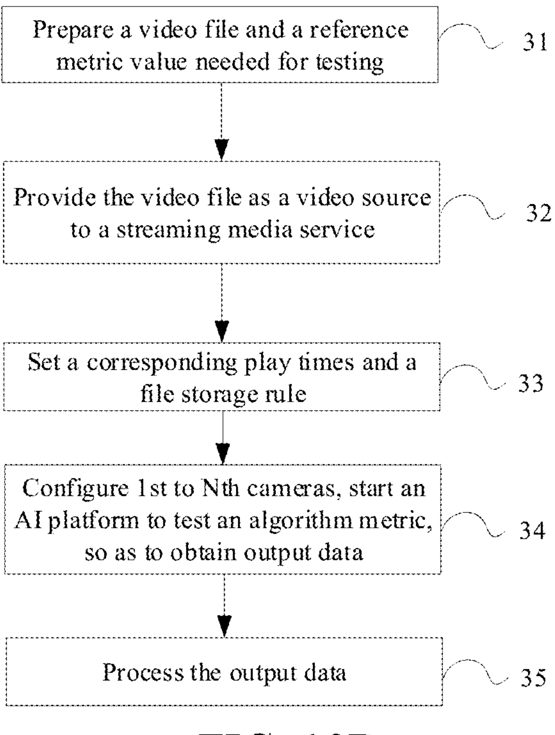
FIG. 10D is a flowchart illustrating acquiring a test result of an algorithm metric provided in an exemplary embodiment of the present disclosure.

In an exemplary implementation, as shown in FIG. 10D, the perimeter intrusion algorithm is taken as an example, acquiring the test result of the algorithm metric may include the following acts 31 to 34.

In the act 31, a video file and a reference metric value needed for testing are prepared.

In an exemplary implementation, the video file may be a video that can be played in mp4 format or other formats.

In an exemplary implementation, the reference metric value may include: a quantity of alarm messages, an alarm picture frame, an average processing frame rate (in fps), a pixel position of an alarm picture detection box, and a system resource occupancy rate (CPU/GPU).

In an exemplary implementation, a method for acquiring a reference metric value may include inputting directly a video file to an offline algorithm, acquiring a quantity of alarm messages output by the offline algorithm, an average processing frame rate, a pixel position of an alarm picture detection box, and a system resource occupancy rate (CPU/GPU). This process can be performed several times and manually checked to acquire a more accurate result.

In the act 32, the video file is provided as a video source to a streaming media service.

In an exemplary implementation, conversion of the video file to a stream may support conversion of the video file to N video streams.

In the act 33, a corresponding play times and a file storage rule are set.

In an exemplary implementation, setting the play times may be setting to play only once without cycling.

In an exemplary implementation, setting the file storage rule may include setting all the alarm message files to be stored separately.

In the act 34, 1st to Nth cameras are configured, an AI platform is started to test an algorithm metric, so as to obtain output data.

In the act 35, the output data are processed.

Figure 10E:
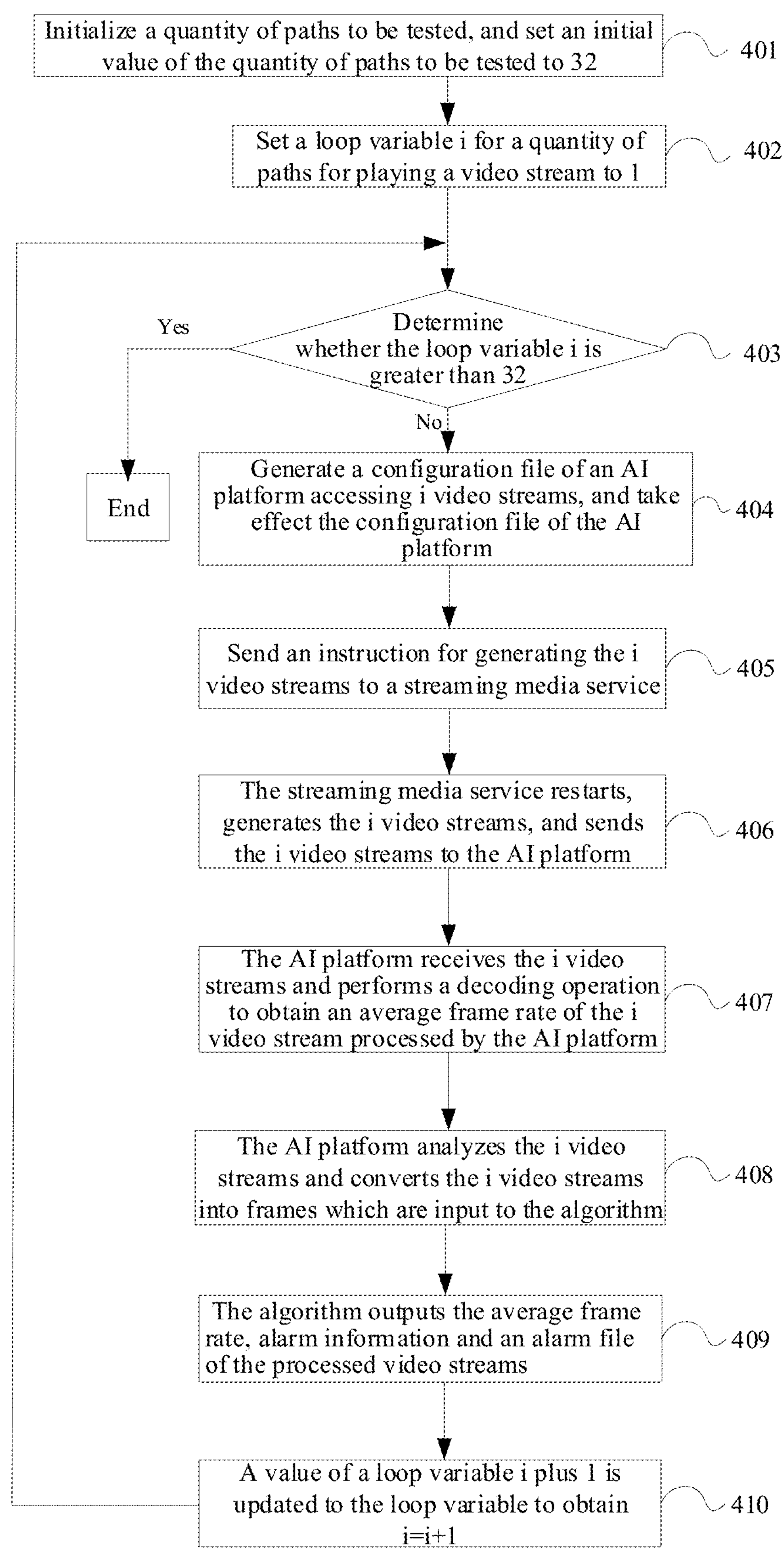
FIG. 10E is a flowchart of testing an AI algorithm metric provided in an exemplary embodiment of the present disclosure.

In an exemplary implementation, the act 34 may be considered as testing the algorithm metric when the N cameras access to the AI platform. As shown in FIG. 10E, an algorithm metric test method may include acts 401 to 410.

In the act 401, a quantity of paths to be tested are initialized, and an initial value of the quantity of paths to be tested is set to 32.

In an embodiment of the present disclosure, the quantity of paths to be tested may be a quantity of paths for playing a video stream.

In the act 402, a loop variable i for a quantity of paths for playing a video stream is set to 1.

In the act 403, whether the loop variable i is greater than 32 is determined, if so, the method ends, otherwise, the method proceeds to the act 404.

In the act 404, a configuration file of an AI platform accessing i video streams is generated, and the configuration file of the AI platform is taken effect.

In the act 405, an instruction for generating the i video streams is sent to a streaming media service.

In the act 406, the streaming media service restarts, generates the i video streams, and sends the i video streams to the AI platform.

In the act 407, the AI platform receives the i video streams and performs a decoding operation to obtain an average frame rate of the i video streams processed by the AI platform.

In the act 407, the AI platform outputs a single-path processing speed (i.e., the average frame rate).

In the act 408, the AI platform analyzes the i video streams and converts the i video streams into frames which are input to the algorithm.

In the act 409, the algorithm outputs the average frame rate, alarm information and an alarm file of the processed video streams.

In the act 409, the algorithm outputs a single-path processing speed (i.e. the average frame rate), single-path alarm information, and a single-path alarm file.

In the act 410, a value of a loop variable i plus 1 is updated to the loop variable to obtain i=i+1, then the method proceeds to the act 403.

In an exemplary implementation, the output data obtained in the act 34 may include the average frame rate when the AI platform processes each video stream in the act 407, the average frame rate when the algorithm processes each video stream in the act 409, the alarm information, the alarm file. In an embodiment of the present disclosure, the alarm information may include a picture frame corresponding to an object in the video stream, time and coordinates of the alarm picture detection box, and the alarm file may include the alarm information. In an embodiment of the present disclosure, the object may be a person or other objects that appear in the video stream.

In an exemplary implementation, process control may be performed by a script during the execution of the above-mentioned acts 401-410, output data are remained in form of logs and files.

In an exemplary implementation, the act 35 may include acts 351 and 352.

In the act 351, whether the average frame rate of the algorithm of each camera in the N cameras meets a given frame rate threshold F (F is an average frame rate preset in advance) is determined. If the average frame rate is lower than the frame rate threshold F, it is considered that the N cameras are not supported. If the average frame rate is higher than the frame rate threshold F, it is considered that the N cameras are supported. Algorithm accuracy at the current time is calculated and recorded, then the act 352 is performed. In an exemplary implementation, the frame rate threshold may be the average processing frame rate set in the act 31.

Figure 10F:
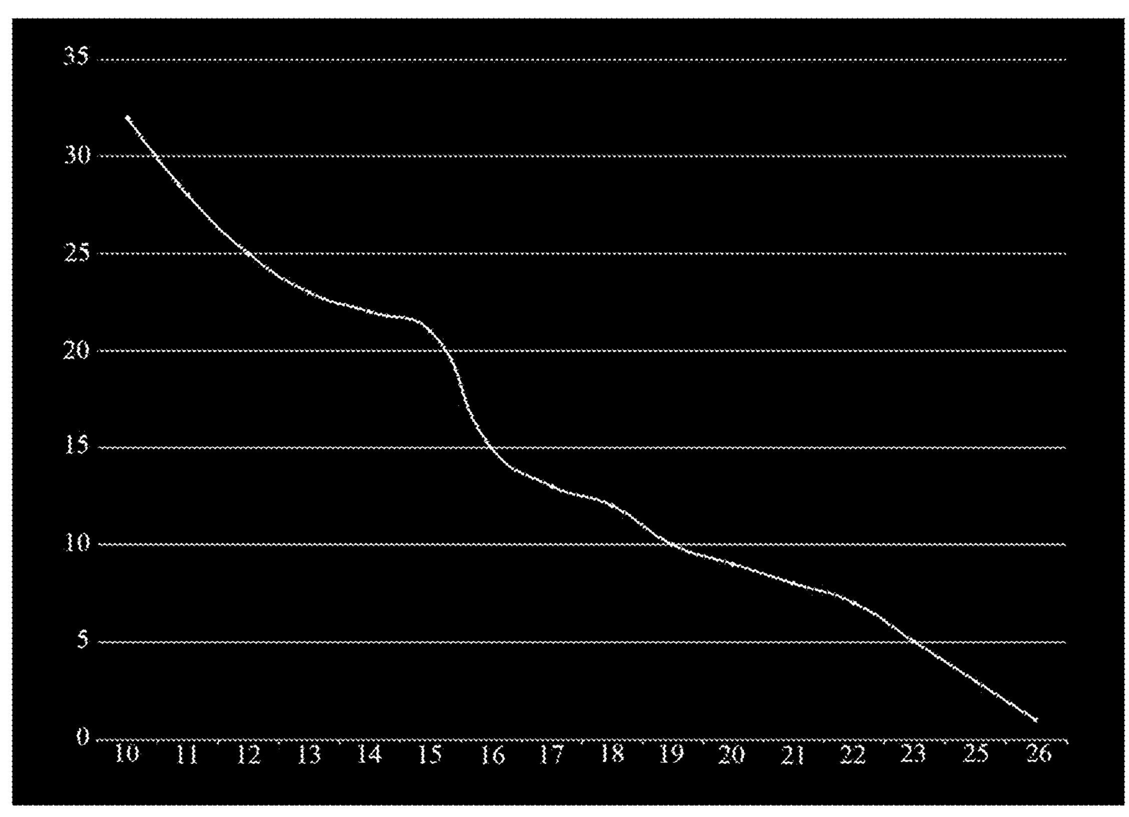
FIGS. 10F to 10H are three graphs of algorithm accuracy versus a quantity of cameras provided in an exemplary embodiment of the present disclosure.
Figure 10G:
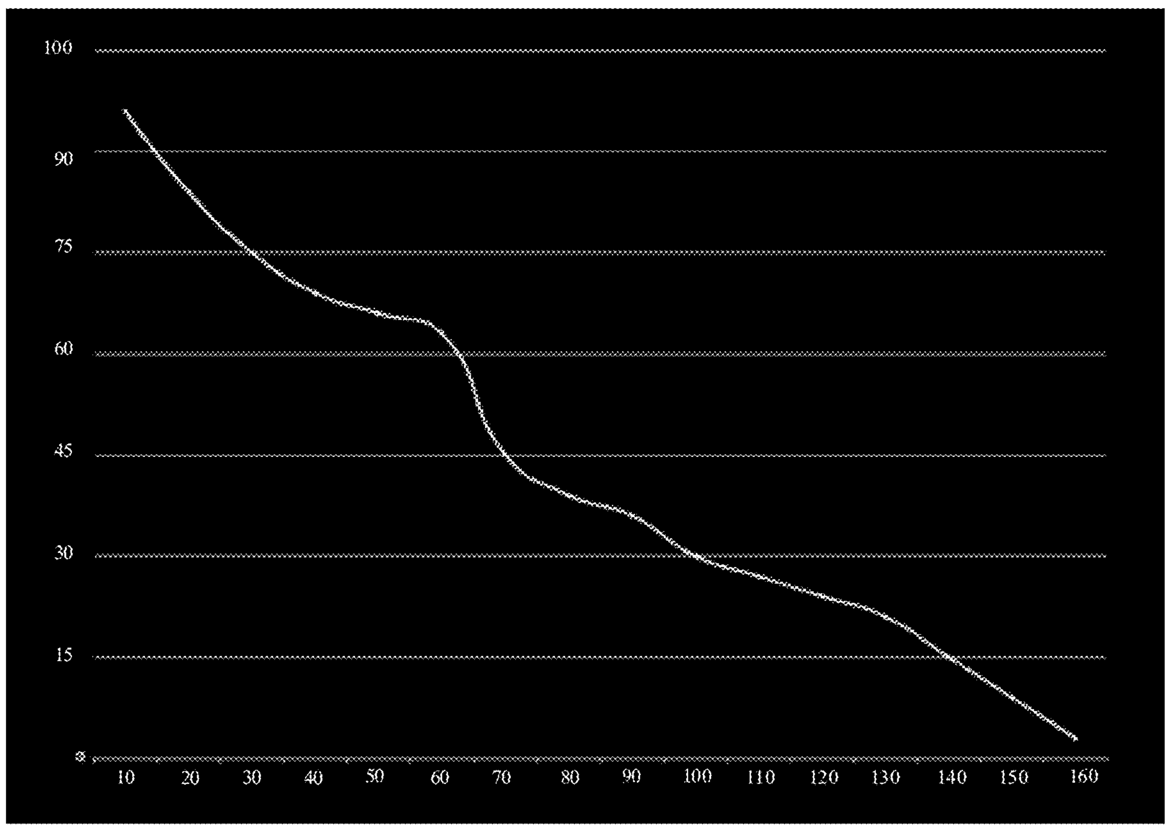
Figure 10H:
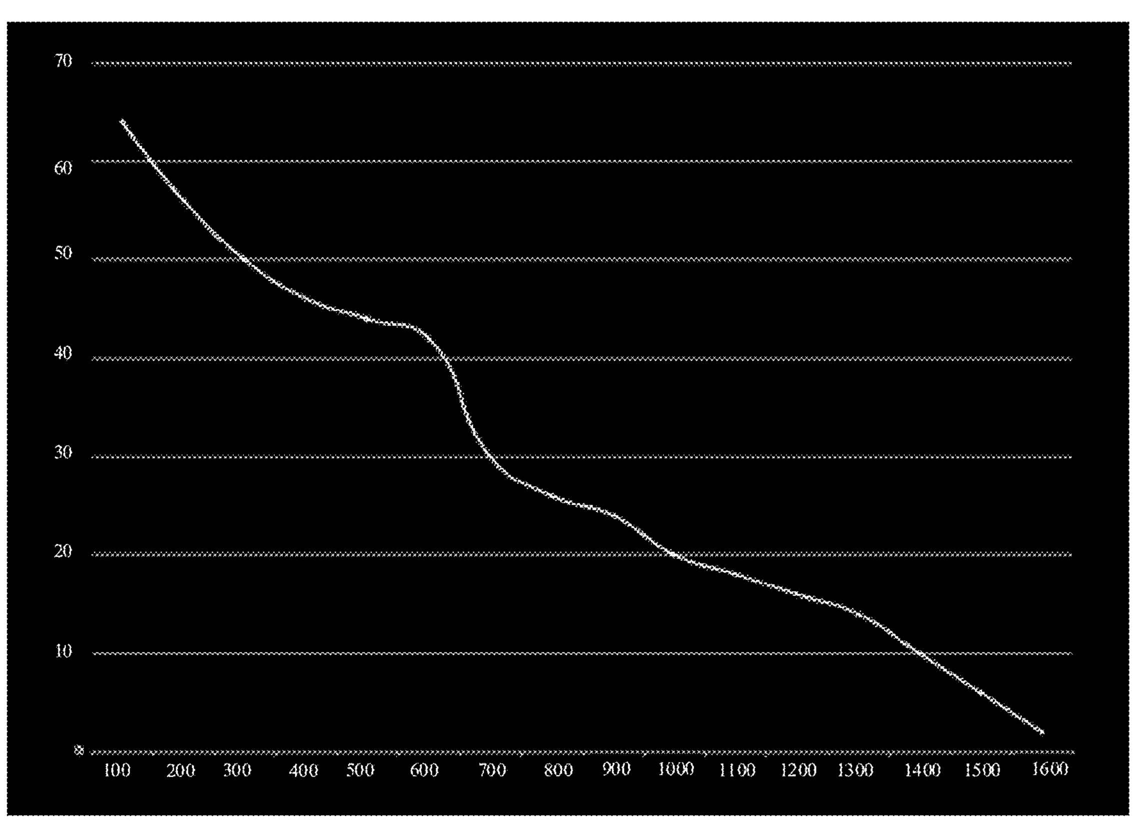

In an exemplary implementation, calculating the algorithm accuracy at the current time may include: reading the output data, comparing a difference between a quantity of alarms in the output data and a quantity of alarm messages in the reference metric value; comparing whether deviation of the coordinates of the alarm picture detection box from reference value coordinates is within a coordinate threshold range (i.e., pixel deviation, wherein the reference value coordinates can be the pixel position of the alarm picture detection box in the act 31); and checking whether the alarm picture is underreported or false alarmed (the alarm picture can be compared with the alarm picture frame in the act 31 one by one). According to the comparison and checking results, the algorithm accuracy is figured out. Curves of the algorithm accuracy versus the quantity of cameras are shown in FIGS. 10F to 10H. In graphs in FIGS. 10F to 10H, an abscissa is a quantity of accessed cameras (that is, a quantity of played video streams), and an ordinate is the algorithm accuracy (unit is %). With an increase of the quantity of accessed cameras, the algorithm accuracy decreases. When accessing actually, an appropriate quantity of cameras to be accessed can be determined according to the curves of the algorithm accuracy versus the quantity of accessed cameras. That is, both the quantity of the accessed cameras and a certain accuracy at that time are taken into account. The quantity of the accessed cameras and the algorithm accuracy differ according to resource configuration of the AI platform. As shown in FIG. 10F, when the quantity of the accessed cameras is 10, the algorithm accuracy is about 30%. When the quantity of the accessed cameras is 19, the algorithm accuracy is about 10%. As shown in FIG. 10G, when the quantity of the accessed cameras is 100, the algorithm accuracy is about 30%. When the quantity of the accessed cameras is about 20, the algorithm accuracy is about 90%. As shown in FIG. 10H, when the quantity of the accessed cameras is 700, the algorithm accuracy is about 30%. When the quantity of the accessed cameras is about 200, the algorithm accuracy is about 70%.

In an exemplary implementation, the coordinate threshold represents a pixel deviation, and a default coordinate threshold may be 6 to 12. For example, the default coordinate threshold maxD=9. That is, a deviation threshold of the coordinate of the alarm picture detection box from the reference value coordinate is 9.

In the act 352, according to a calculation result, a graph of the quantity of supported cameras, the average frame rate, and the algorithm accuracy is obtained.

The curve of the algorithm accuracy versus the quantity of cameras, a curve of the CPU/GPU utilization rate versus the quantity of cameras, and the curve of the frame rate versus the quantity of cameras can be obtained in the acts 351 and 352.

Algorithm metric verification (detection/recognition) usually employs an artificial verification method, which has high accuracy, but when there are dozens or hundreds of thousands supported cameras, labor cost is extremely high. The algorithm metric test method provided in an embodiment of the present disclosure can automatically acquire the curve of the algorithm metric versus the quantity of cameras, thus greatly reducing the labor cost. In an embodiment of the present disclosure, a mode of accessing different quantities of video streams simulates accessing different numbers of cameras, and the quantity of cameras can be understood as the quantity of video streams when playing a video source file.

The algorithm test platform in an embodiment of the present disclosure can standardize a critical activity of an algorithm test and support a visual construction of a test task process.

In some exemplary implementations, the method further includes a process of displaying an algorithm test by patterning.

In some exemplary implementations, the process of displaying the algorithm test by patterning includes:

generating a workbench area corresponding to a background according to an analyzed type;

arranging an analyzed parameter in the workbench area in a form of icon, and connecting a plurality of icons according to a data flow direction;

displaying a test state change and a part of a test result in the workbench area; and at the end of a test, switching the workbench area to a result display area (or the test result can be displayed directly in the workbench area).

Figure 11:
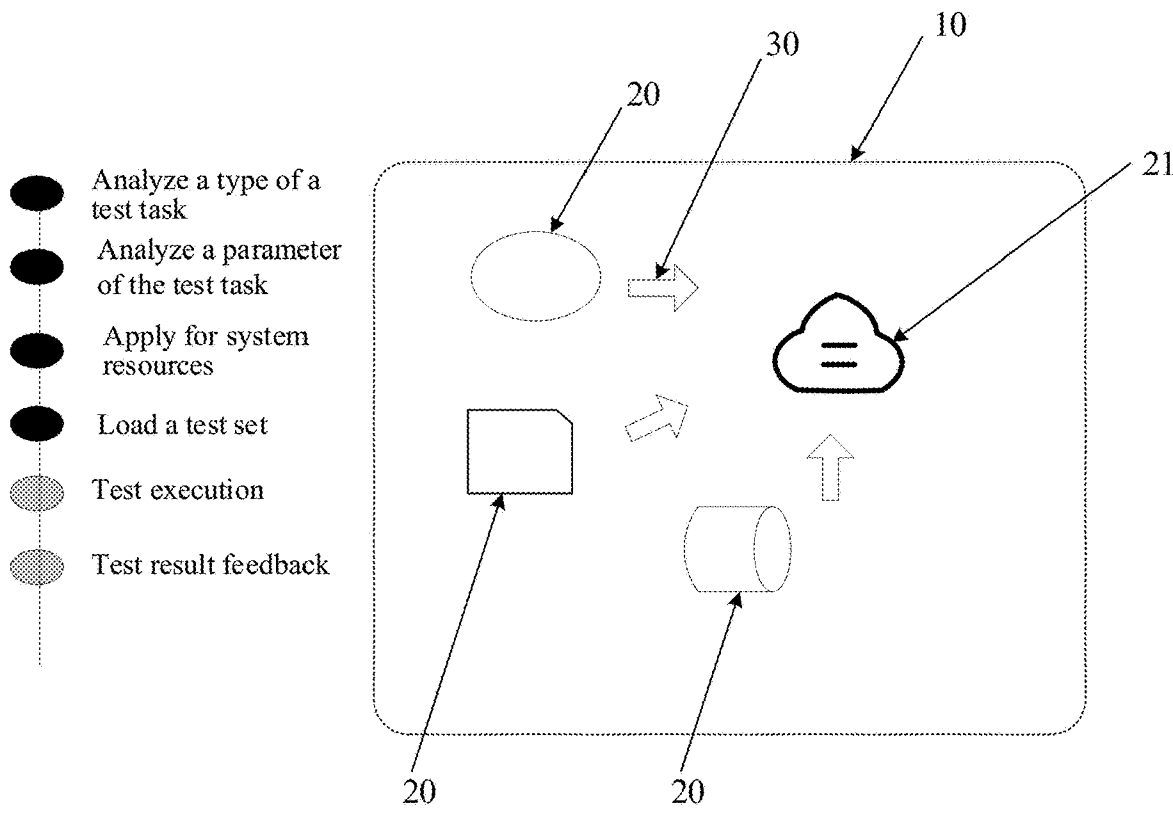
FIG. 11 is a schematic diagram of an algorithm test procedure visualization method provided in an exemplary embodiment of the present disclosure.

As shown in FIG. 11, some critical activities (such as analyzing a type of a test task, analyzing a parameter of the test task, test preparation, test execution, and feeding back a test result) of an algorithm test process are standardized as a through standard line.

1) After the algorithm test type is analyzed, a workbench area 10 with different backgrounds is generated according to the task type (for example, an empty desktop can be displayed in the workbench area 10 in this act, and a background color of the desktop is displayed as a preset color of a corresponding task); at the same time, text prompt information is given. For example, the text prompt information may be “Start task type analysis” and “Analyzed task type: XX”.

2) After an algorithm system resource parameter is analyzed, resource allocation is automatically completed, and system resource information is arranged in the workbench area 10 in the form of icon familiar to the user (for example, in the workbench area 10, an icon of the analyzed system resource is displayed and a quantity is marked), and text prompt information is given at the same time. For example, the text prompt information may be “Start task parameter analysis” and “Parameter of task to be executed: XX”.

The analyzed test task needs to carry a system resource parameter specified by the algorithm test platform, and a parameter value is in a range given by the algorithm test platform. For example, 1) for a model test, XX GPUs, XX CPUs and XX system memory are specified. After receiving the system resource parameter, 1) a server side directly calls an API interface (such as K8S, i.e. Kubernetes) of an open source tool to complete resource allocation. 2) A system resource allocation scheduling interface built in a device (such as an edge intelligent computing box) is used to complete then resource allocation.

3) After other input parameters of the algorithm are analyzed, icons 20 of a tested object and the input parameters are automatically generated (for example, the workbench area 10 displays the icon of the tested object and other input parameters (customized as needed), wherein the icon of the tested object can be displayed as a dashed box), and text prompt information is given at the same time. For example, the text prompt information may be “Requesting for system resources”.

Other input parameters include an algorithm version, an algorithm name and other auxiliary information. The system has a built-in template picture or is open to users to upload some icons. For example, if there is a model test task, an icon corresponding to the model can be matched according to a model keyword, and then loaded and displayed in the workbench area 10.

4) After a model test data set is loaded, an icon of the model test data set is automatically generated (for example, as shown in FIG. 11, the workbench area 10 displays a plurality of icons 20 of the model test data sets loaded by the test task, and the plurality of icons 20 of the model test data sets are aggregated as a test data set 21, and a data flow direction can be indicated by an arrow 30 in the workbench area 10). Meanwhile, text prompt information is given. For example, the text prompt information may be “Loading model test data set”.

5) When algorithm input processing is completed, relevant entity icons are automatically connected. At the same time, text prompt information is given. The workbench area 10 displays various elements needed by the test execution. In the algorithm test process, a connection line can be dynamic, such as a dashed arrow. Input contents, the tested object and dependent resources are associated, each of the input contents, the tested object and the dependent resources can be displayed separately.

6) When the algorithm starts running, operating state changes and some results are presented continuously in the workbench area; at the same time, text prompt information is given. For example, the text prompt information may be “Test executing” and “Test completed”.

With execution of the test, a test progress can be given by a transparently displayed test log or the arrow, which prompts a result of a critical metric item when the critical metric item is output.

7) When the algorithm is finished, an original workbench area 10 is switched to the result display area with the picture zooming out and moving downward, and it supward side is switched to the result display area. The result display area displays a result of current execution by default, and can independently build different comparison dimensions and restart the test. For example, text prompt information may be “The result has been fed back, please click the XX link below to view it”. The result display area displays the test result including a detailed parameter when the test task is created and a test execution result, and the metric value can be downloaded or jump to a metric value editing page through a link to provide a result editing function.

In some exemplary implementation, the method further includes a process of building an algorithm test by patterning. According to the process of building the algorithm test by patterning in an embodiment of the present disclosure, the test acts can emphatically present, interactively modify, and increase/decrease acts.

For example, the process of building the algorithm test by patterning includes:

generating a workbench area corresponding to a background in response to a first operation of a user, the first operation is to select a type of a test task;

arranging an input of the test task in the workbench area in a form of icon in response to a second operation of the user, wherein the second operation is to select the input of the test task; the input of the test task includes a test device, a test data set, a tested algorithm, and a data flow direction; and a plurality of icons are connected according to the data flow direction;

displaying a test state change and a part of a test result in the workbench area in response to a third operation of the user, wherein the third operation is to click a start test button; and at the end of a test, switching the workbench area to a result display area (or the test result can be displayed directly in the workbench area).

For example, the algorithm test platform provides a user interface. The user interface includes a resource selection area, a workbench area, a result display area and other areas. The resource selection area can provide a test device (including hardware resources, software resources, etc.), a test data set, a tested algorithm, data flow direction and other contents that can be selected by the user. The user can select the above-mentioned contents and drag them to the workbench area to build an algorithm test process through a visual process.

For example, the user can select any one or more of the test device, test data set, tested algorithm, data flow and the like to modify after dragging the test device, test data set, tested algorithm, data flow and the like to the workbench area.

For example, after the user drags the test data set to the workbench area, the user can change an attribute parameter of the test data set. For example, when the test data set contains 300,000 measurable pictures, the user can select some of the pictures (e.g., 10,000 or 30,000 pictures) for testing.

In an actual application scenario (e.g., a smart district, a smart city, smart transportation, etc.), there is a requirement for a plurality of tested algorithms in one scenario. At that time, for the above-mentioned requirements in an identical scenario, the plurality of tested algorithms are involved. For example, a smart supermarket application scenario needs to use face recognition, traffic recognition, commodity hot zone and other algorithm models at a same time. At that time, in the workbench area, a single test data set can be allocated by a plurality of tested algorithms, thus meeting a test requirement of a complex application scenario.

For example, the user may change a tested algorithm after the user has dragged the tested algorithm to the workbench area. For example, in a smart supermarket application scenario, according to a requirement of a current actual application scenario, a tested face recognition model is replaced by a human detection model.

For example, the process of building the algorithm test by patterning further includes:

- modifying the data flow direction in response to a fourth operation of the user; wherein the fourth operation includes at least one of the following:
- performing a reverse or rotation operation on an icon of the data flow direction; and
- fixing the icon of the data flow direction, dragging a source icon of the data flow direction to a sink icon of the data flow direction or dragging the sink icon of the data flow direction to the source icon of the data flow direction, so that the source icon of the data flow direction and the sink icon of the data flow direction change positions with each other.

In an embodiment of the present disclosure, the user can change the data flow direction in any of the following conditions: the user has built the input of the test task but has not started the test, the user has started the test and paused the test, or the user has completed the test. The source icon of the data flow direction refers to a starting point of the data flow, and the sink icon of the data flow direction refers to an end point of the data flow. As shown in FIG. 11 the source icon of the data flow direction is icon 20 and the sink icon of the data flow direction is icon 21.

For example, during testing, the workbench area may display floating test status change as well as partial test results. For floating contents displayed in the workbench area, a delete button can be set in an upper right corner of the contents, and the user can delete the floating display contents by clicking the delete button.

An algorithm test platform is also provided in an embodiment of the present disclosure, including a memory, and a processor connected to the memory for storing instructions, the processor is used for performing the acts of the algorithm test method described in any embodiment of the present disclosure based on the instructions stored in the memory.

Figure 12:
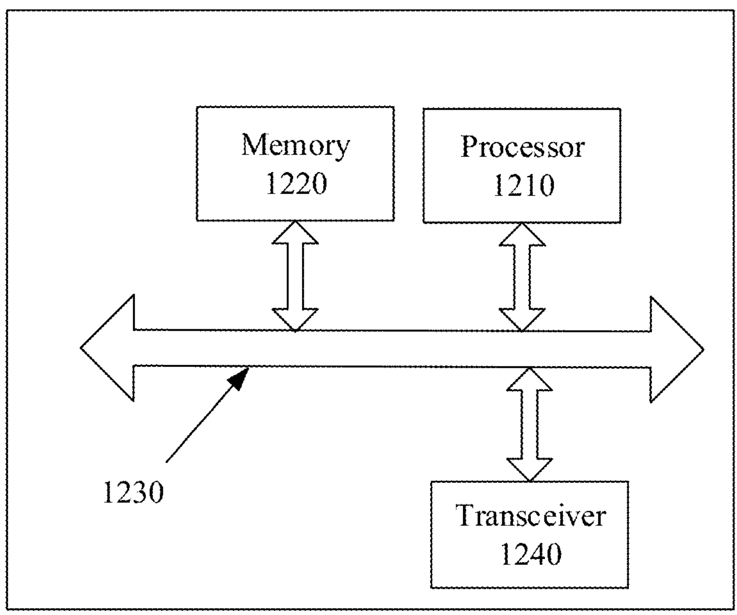
FIG. 12 is a schematic diagram of a structure of an algorithm test platform provided in an exemplary embodiment of the present disclosure.

As shown in FIG. 12, in an example, the algorithm test platform may include a processor 1210, a memory 1220, a bus system 1230, and a transceiver 1240, wherein the processor 1210, the memory 1220, and the transceiver 1240 are connected via the bus system 1230, the memory 1220 is used for storing instructions, and the processor 1210 is used for executing the instructions stored in the memory 1220 to control the transceiver 1240 to transmit and receive signals. Specifically, the transceiver 1240 can receive a test task, issue the test task, receive a test result and feed back the test result under the control of the processor 1210. The processor 1210 analyzes a type and a parameter of the received test task, wherein the type of the test task includes at least one of the following: an algorithm model test, an algorithm interface test and an algorithm online operation state test. According to the analyzed type and parameter, the processor 1210 performs test preparation and issues the test task, and outputs the obtained test result to a display interface through the transceiver 1240.

It should be understood that the processor 1210 may be a Central Processing Unit (CPU), or the processor 1210 may be another general-purpose processor, a Digital Signal Processor (DSP), an Application Specific Integrated Circuit (ASIC), a Field Programmable Gate Array (FPGA), or another programmable logic device, a discrete gate or a transistor logic device, a discrete hardware component, etc. The general-purpose processor may be a microprocessor, or the processor may be any conventional processor, etc.

The memory 1220 may include a read only memory and a random access memory, and provides instructions and data to the processor 1210. A portion of the memory 1220 may further include a non-volatile random access memory. For example, the memory 1220 may also store information of a device type.

The bus system 1230 may include a power bus, a control bus, a status signal bus, or the like in addition to a data bus. However, for clarity of illustration, various buses are all denoted as the bus system 1230 in FIG. 12.

In an implementation process, processing performed by a processing device may be completed through an integrated logic circuit of hardware in the processor 1210 or instructions in a form of software. That is, the acts of the method in the embodiments of the present disclosure may be embodied as executed and completed by a hardware processor, or executed and completed by a combination of hardware in the processor and a software module. The software module may be located in a storage medium such as a random access memory, a flash memory, a read only memory, a programmable read-only memory, or an electrically erasable programmable memory, or a register, etc. The storage medium is in the memory 1220, and the processor 1210 reads information in the memory 1220 and implements the acts in the above method in combination with its hardware. In order to avoid repetition, detailed description is not provided herein.

A computer-readable storage medium is also provided in an embodiment of the present disclosure, on which a computer program is stored, when the program is executed by a processor, the algorithm test method described in any of the embodiments of the present disclosure is implemented. A method of driving prognosis analysis by executing executable instructions is substantially the same as the algorithm test method provided in the above embodiments of the present disclosure and will not be repeated here.

In some possible implementations, various aspects of the algorithm test method provided in the present application may also be implemented in the form of a program product, which includes program codes. When the program product is run on a computer device, the program codes are used to enable the computer device to perform the acts in the algorithm test method described above in this specification according to various exemplary embodiments of the present application. For example, the computer device may perform the algorithm test method described in the embodiments of the present application.

For the program product, any combination of one or more readable media may be employed. A readable medium may be a readable signal medium or a readable storage medium. The readable storage medium may be, for example, but is not limited to, an electrical, magnetic, optical, electromagnetic, infrared, or semiconductor system, apparatus or device, or a combination of any of the above. More specific examples (non-exhaustive list) of the readable storage medium include electrical connections with one or more wires, portable computer disks, hard disks, Random Access Memories (RAM), Read-only Memories (ROM), Erasable Programmable Read-only Memories (EPROM or flash memories), optical fibers, portable Compact Disk Read-only Memories (CD-ROM), optical storage devices, magnetic storage devices, or any suitable combination of the above.

Those of ordinary skills in the art may understand that all or some of acts in the methods disclosed above, functional modules or units in systems and apparatuses may be implemented as software, firmware, hardware, and an appropriate combination thereof. In a hardware implementation, division between functional modules/units mentioned in the above description does not necessarily correspond to division of physical components. For example, a physical component may have a plurality of functions, or a function or an act may be performed by several physical components in cooperation. Some components or all components may be implemented as software executed by a processor such as a digital signal processor or a microprocessor, or implemented as hardware, or implemented as an integrated circuit such as a specific integrated circuit. Such software may be distributed on a computer-readable medium, and the computer-readable medium may include a computer storage medium (or a non-transitory medium) and a communication medium (or a transitory medium). As known to those of ordinary skills in the art, a term computer storage medium includes volatile or nonvolatile, and removable or irremovable media implemented in any method or technology for storing information (for example, a computer-readable instruction, a data structure, a program module, or other data). The computer storage medium includes, but is not limited to, a RAM, a ROM, an EEPROM, a flash memory or another memory technology, a CD-ROM, a Digital Versatile Disk (DVD) or another optical disk storage, a magnetic cartridge, a magnetic tape, magnetic disk storage or another magnetic storage apparatus, or any other medium that may be used for storing desired information and may be accessed by a computer. In addition, it is known to those of ordinary skills in the art that the communication medium usually includes a computer-readable instruction, a data structure, a program module, or other data in a modulated data signal of, such as, a carrier or another transmission mechanism, and may include any information delivery medium.

Although the implementations disclosed in the present disclosure are described as above, the described contents are only implementations which are used for facilitating the understanding of the present disclosure, but are not intended to limit the present invention. Any skilled person in the art to which the present disclosure pertains may make any modifications and variations in forms and details of implementations without departing from the spirit and scope of the present disclosure. However, the patent protection scope of the present invention should be subject to the scope defined by the appended claims.

The invention claimed is:

1. A test method for testing an algorithm, applied to an algorithm test platform side to implement automatic test, comprising:

storing instructions in a memory; and performing, by a processor connected to the memory, the following steps based on the instructions stored in the memory:

receiving a test task of the algorithm that is input in the algorithm test platform side, wherein the test task comprises a type and a parameter of the test task, and the type of the test task comprises at least one of the following: an algorithm model test, an algorithm interface test and an algorithm online operation state test;

performing test preparation according to the type and the parameter of the test task; and executing the test task and displaying and/or feeding back a test result in the algorithm test platform side; or, issuing the test task to a test device to let the test device execute the test task, receiving a test result from the test device, and displaying and/or feeding back the test result in the algorithm test platform side;

wherein the parameter of the test task includes a type attribute parameter;

when the test task is the algorithm model test, the type attribute parameter comprises an algorithm model related parameter, a model test data set related parameter, a system resource demand parameter, and a concerned metric item parameter;

when the test task is the algorithm interface test, the type attribute parameter comprises an algorithm interface related parameter, a function verification set related parameter, a system resource demand parameter, and a concerned metric item parameter; and when the test task is the algorithm online operation state test, the type attribute parameter comprises an algorithm interface related parameter and an operation state verification set related parameter;

wherein, when the test task is the algorithm model test, the algorithm model related parameter comprises a container environment address and a download address of a tested algorithm; wherein performing the test preparation comprises: allocating system resources according to the system resource demand parameter; downloading an operation environment and a tested algorithm model to complete compiling, deploying and starting according to the container environment address and the download address of the tested algorithm; and loading the model test data set;

when the test task is the algorithm interface test or the algorithm online operation state test, the algorithm interface related parameter comprises an algorithm calling address, algorithm calling parameter information and assertion information; wherein performing the test preparation comprises: generating a test script according to the algorithm calling address, the algorithm calling parameter information and the assertion information; and loading the function verification set or the operation state verification set;

wherein the algorithm test platform provides a retrieval portal through which details of all previous test records of the algorithm are able to be retrieved based on a test history of the algorithm retained by the algorithm test platform, the details of all previous test records of the algorithm comprise an algorithm version, a test data set dimension used by the algorithm, an execution duration of a previous test task of the algorithm, an execution result of the previous test task of the algorithm, and when a name keyword of the algorithm is input, retrieved information corresponding to the algorithm test platform side is obtained.

2. The test method of claim 1, wherein the parameter of the test task further comprises a task execution frequency, a result output rule and a message notification rule;

the task execution frequency comprises immediate execution, triggering execution and periodic execution;

the result output rule comprises selecting a output content and selecting a result output form; and the message notification rule comprises a message notification form, a message notification object and a message notification content.

3. The test method of claim 1, wherein the concerned metric item parameter comprises an algorithm accuracy metric, algorithm processing efficiency and system resource usage, wherein:

the algorithm test platform provides a plurality of algorithm accuracy metrics, and a secondary classification is performed on the algorithm accuracy metrics provided by the algorithm test platform according to different application scenarios or deployment modes; and the algorithm processing efficiency comprises a response time and a throughput.

4. The test method of claim 3, wherein the application scenarios comprise one or more of following customized scenarios:

a camera focal length and recognition distance test;

an algorithm accuracy metric test at different quantities of algorithm paths and different crowd picture densities;

an algorithm accuracy metric test of a same algorithm at different illuminations and different occlusion areas;

a recognition accuracy metric test of a same algorithm at different distances; and a model evaluation metric test of a same algorithm model with a plurality of iterations.

5. The test method of claim 1, wherein receiving the test task comprises any one of the following:

receiving input type and parameter information of the test task in response to an operation of configuring a front page of the algorithm test platform; and receiving a test task sent by an external platform.

6. The test method of claim 5, wherein configuring the front page of the algorithm test platform comprises:

selecting a model test data set, a function verification set or an operation state verification set according to a data set provided by the algorithm test platform, wherein the model test data set, the function verification set and the operation state verification set are respectively used for the algorithm model test, the algorithm interface test and the algorithm online operation state test, the data set provided by the algorithm test platform is classified according to different application scenarios, and a secondary classification is performed on the data set under each application scenario according to at least one of following dimensions: metric item information, camera information, picture scenario information and environment information.

7. The test method of claim 5, wherein, when configuring the front page of the algorithm test platform, the method further comprises:

authenticating a login account, wherein the login account comprises an algorithm developer account, an algorithm tester account and an algorithm business person account; wherein the algorithm developer account is used for creating and issuing a test task, and browsing a test result, the algorithm developer account is used for selecting a self-test data set and a test data set when creating the test task, and a content of the self-test data set is visible to the algorithm developer account, while a content of the test data set is not visible to the algorithm developer account; the algorithm tester account is used for creating and issuing a test task, and browsing a test result, the algorithm tester account is used for selecting the test data set when creating the test task, and the content of the test data set is visible to the algorithm tester account; and the algorithm business person account is used for browsing the test result.

8. The test method of claim 1, wherein the test result is displayed in any of the following: a table, a graph, and a page;

the test result comprises at least one of the following:

a test result of a concerned metric item, and/or an occupied system resource situation of a current test task;

test results of a metric item of a same algorithm version in different hardware resource configurations;

test results of a metric item of different algorithm versions in a same hardware resource configuration;

test results of a metric item of a same algorithm version under different test data sets; and test results of a metric item of a same algorithm version in different application scenarios, wherein the application scenarios comprise at least one of the following: camera information, picture scenario information and environment information.

9. The test method of claim 1, wherein the method further comprises: a process of displaying or building the algorithm test by patterning.

10. The test method of claim 9, wherein the process of displaying the algorithm test by patterning, comprises:

generating a workbench area corresponding to a background according to the type of the test task;

arranging the parameter of the test task in the workbench area in a form of icon, and connecting a plurality of icons according to a data flow direction;

displaying a test state change and part of the test result in the workbench area;

switching the workbench area to a result display area when the test is completed.

11. The test method of claim 9, wherein the process of building the algorithm test by patterning, comprises:

generating a workbench area corresponding to a background in response to a first operation of a user, wherein the first operation is to select the type of the test task;

arranging an input of the test task in the workbench area in a form of icon in response to a second operation of the user, wherein the second operation is to select the input of the test task, the input of the test task comprises the test device, a test data set, a tested algorithm, and a data flow direction; and a plurality of icons are connected according to a data flow direction;

display a test state change and part of the test result in the workbench area in response to a third operation of the user, wherein the third operation is to click a start test button;

switching the workbench area to a result display area when the test is completed.

12. The test method of claim 11, wherein the process of building the algorithm test by patterning, further comprises:

modifying the data flow direction in response to a fourth operation of the user; wherein the fourth operation comprises at least one of the following:

performing a reverse or rotation operation on an icon of the data flow direction;

fixing an arrow of the data flow direction, dragging a source icon of the data flow direction to a sink icon of the data flow direction or dragging the sink icon of the data flow direction to the source icon of the data flow direction, to enable the source icon of the data flow direction and the sink icon of the data flow direction to exchange positions with each other.

13. The test method of claim 1, further comprising:

providing an input interface for online data feedback, and adding fed-back online data to a data set of the algorithm test platform.

14. An test platform for testing an algorithm, comprising the memory and the processor connected to the memory, wherein the memory is used for storing instructions, and the processor is configured to execute acts of the test method of claim 1 based on the instructions stored in the memory.

15. A non-transitory computer-readable storage medium having stored thereon a computer program wherein, when the computer program is executed by a processor, the test method of claim 1 is implemented.

* * * * *